(12) United States Patent
Watanabe et al.

(10) Patent No.: US 10,900,773 B2
(45) Date of Patent: *Jan. 26, 2021

(54) DISTANCE MEASURING DEVICE AND THREE-DIMENSIONAL SHAPE MEASURING APPARATUS

(71) Applicant: Hitachi, Ltd., Tokyo (JP)

(72) Inventors: Masahiro Watanabe, Tokyo (JP); Tatsuo Hariyama, Tokyo (JP); Atsushi Taniguchi, Tokyo (JP); Kenji Maruno, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/484,844

(22) PCT Filed: May 22, 2018

(86) PCT No.: PCT/JP2018/019625
§ 371 (c)(1),
(2) Date: Aug. 9, 2019

(87) PCT Pub. No.: WO2018/225496
PCT Pub. Date: Dec. 13, 2018

(65) Prior Publication Data
US 2020/0041259 A1    Feb. 6, 2020

(30) Foreign Application Priority Data

Jun. 6, 2017   (JP) .................. 2017-111271
Mar. 14, 2018  (JP) .................. 2018-046769

(51) Int. Cl.
*G01B 11/24*   (2006.01)
*G01C 3/08*    (2006.01)

(52) U.S. Cl.
CPC ............. *G01B 11/24* (2013.01); *G01C 3/08* (2013.01)

(58) Field of Classification Search
CPC ...... G01B 11/026; G01B 11/24; G01B 11/005; G01B 11/12; G01B 9/0209; G01B 9/02004; G01S 17/34; G01S 17/00; G01C 3/08

See application file for complete search history.

(56) References Cited

U.S. PATENT DOCUMENTS 4,661,692 A * 4/1987 Kawasaki ............ G02B 21/244
                                              250/201.2
5,949,546 A    9/1999 Lee et al.
(Continued)

FOREIGN PATENT DOCUMENTS

JP         50-8668 B1    4/1975
JP      2000-241133 A    9/2000
(Continued)

OTHER PUBLICATIONS

International Search Report (PCT/ISA/220 & PCT/ISA/210) issued in PCT Application No. PCT/JP2018/019625 dated Aug. 14, 2018 with English translation (six pages).
(Continued)

*Primary Examiner* — Sang H Nguyen
(74) *Attorney, Agent, or Firm* — Crowell & Moring LLP

(57) ABSTRACT

An object is to provide a technology capable of realizing miniaturizing of a measurement unit in a distance measuring device. The distance measuring device including a light emitting unit that outputs measurement light, a polarization state control unit that controls polarization of the measurement light output from the light emitting unit, and an optical path switching element that selectively emits the measurement light controlled by the polarization state control unit, in which the polarization state control unit controls the polarization so as to emit the measurement light in a plurality of directions from the optical path switching element, and the optical path switching element receives
(Continued)

reflected light with respect to an object of the measurement light emitted from the optical path switching element, the reflected light being used to measure a distance to the object.

23 Claims, 15 Drawing Sheets

(56) References Cited

U.S. PATENT DOCUMENTS

| | | | | |
|---|---|---|---|---|
| 7,542,210 | B2* | 6/2009 | Chirieleison, Sr. | ............................ G02B 27/0093 345/8 |
| 2003/0179387 | A1* | 9/2003 | Uno | ...................... G01B 11/026 356/624 |
| 2007/0211259 | A1* | 9/2007 | Jeon | ........................ G01B 11/25 356/605 |
| 2008/0177138 | A1 | 7/2008 | Courtney et al. | |
| 2008/0257024 | A1* | 10/2008 | Watanabe | ............... B82Y 35/00 73/105 |
| 2010/0033731 | A1* | 2/2010 | Shimizu | ............. G01B 9/02021 356/493 |
| 2011/0051146 | A1* | 3/2011 | Jensen | ............... G01B 9/02067 356/493 |
| 2011/0080593 | A1* | 4/2011 | Sato | ...................... G01B 21/042 356/512 |
| 2014/0362385 | A1 | 12/2014 | Uemura | |
| 2015/0055115 | A1 | 2/2015 | Pedersen et al. | |
| 2015/0300803 | A1* | 10/2015 | Horimai | ............. G01B 9/02011 356/458 |
| 2016/0209333 | A1 | 7/2016 | Hirono et al. | |
| 2016/0258738 | A1* | 9/2016 | Shimaoka | ............... G01B 5/012 |
| 2017/0242100 | A1 | 8/2017 | Hinokuma et al. | |
| 2018/0143000 | A1 | 5/2018 | Yamazaki et al. | |

FOREIGN PATENT DOCUMENTS

| | | |
|---|---|---|
| JP | 2002-31514 A | 1/2002 |
| JP | 2006-292642 A | 10/2006 |
| JP | 2007-206049 A | 8/2007 |
| JP | 2007-271601 A | 10/2007 |
| JP | 2008-191021 A | 8/2008 |
| JP | 2014-238299 A | 12/2014 |
| JP | 2015-517094 A | 6/2015 |
| JP | 2015-232539 A | 12/2015 |
| JP | 2016-133393 A | 7/2016 |
| JP | 2017-18663 A | 1/2017 |
| WO | WO 2012/099151 A1 | 7/2012 |
| WO | WO 2016/024332 A1 | 2/2016 |
| WO | WO 2017/006848 A1 | 1/2017 |

OTHER PUBLICATIONS

Japanese-language Written Opinion (PCT/ISA/237) issued in PCT Application No. PCT/JP2018/019625 dated Aug. 14, 2018 (four pages).
Japanese-language Office Action issued in Japanese Application No. 2019-073934 dated Mar. 17, 2020 (two (2) pages).

* cited by examiner

[Fig. 1]
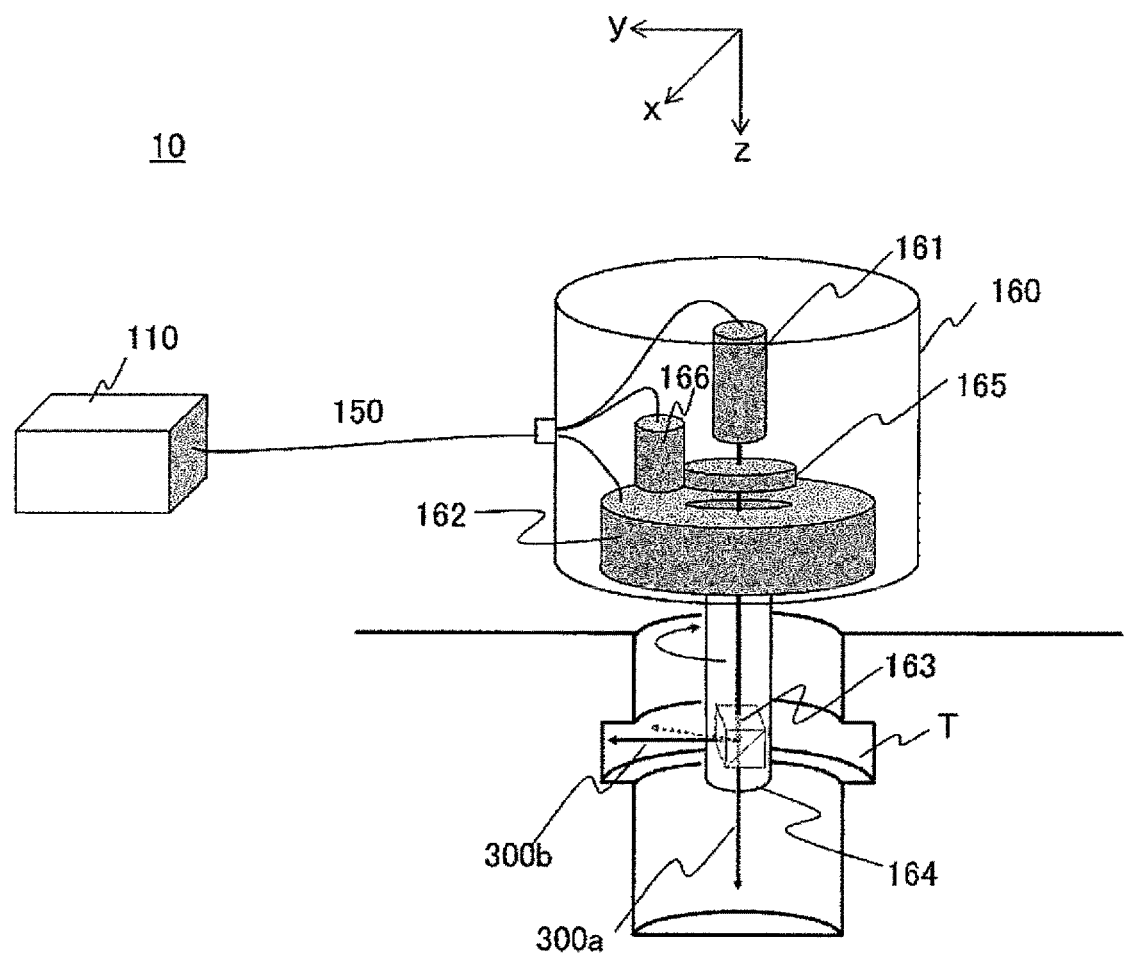

[Fig. 3]
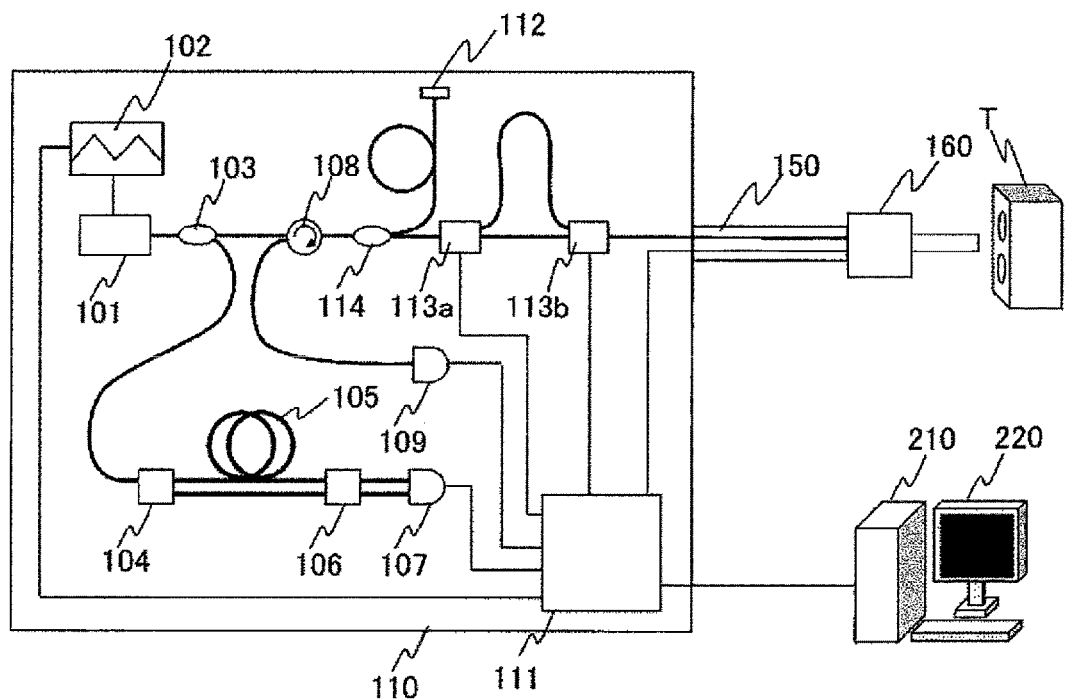
[Fig. 4]
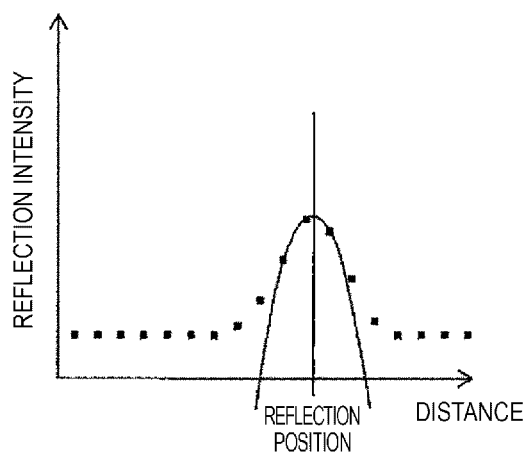

[Fig. 5]
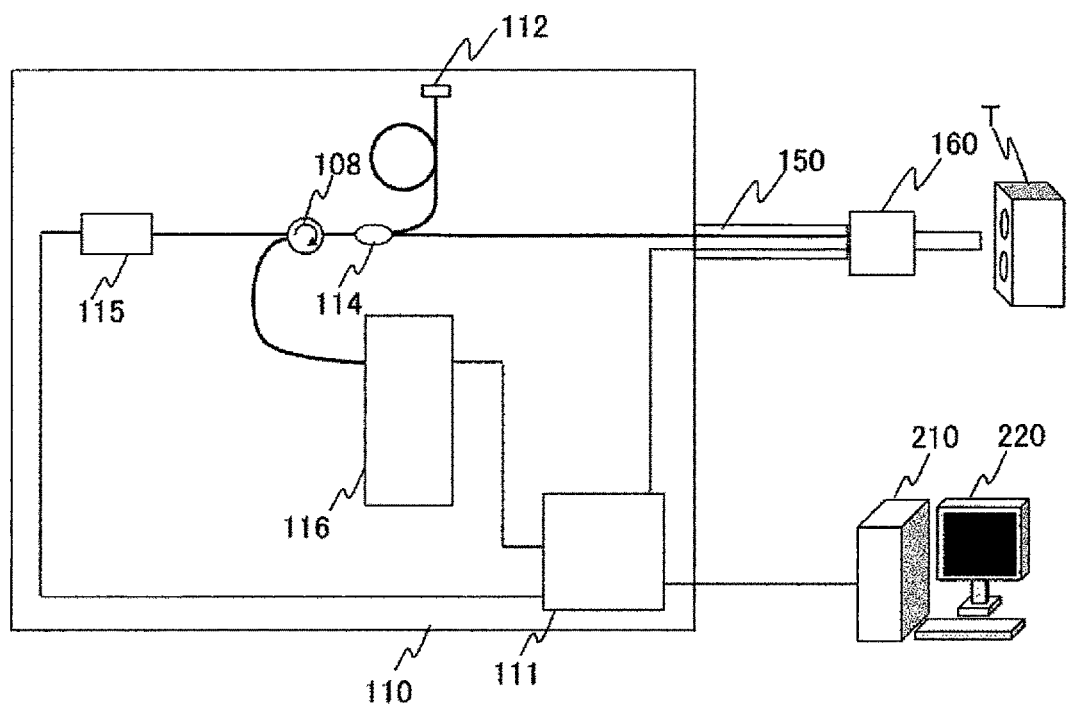

[Fig. 6]
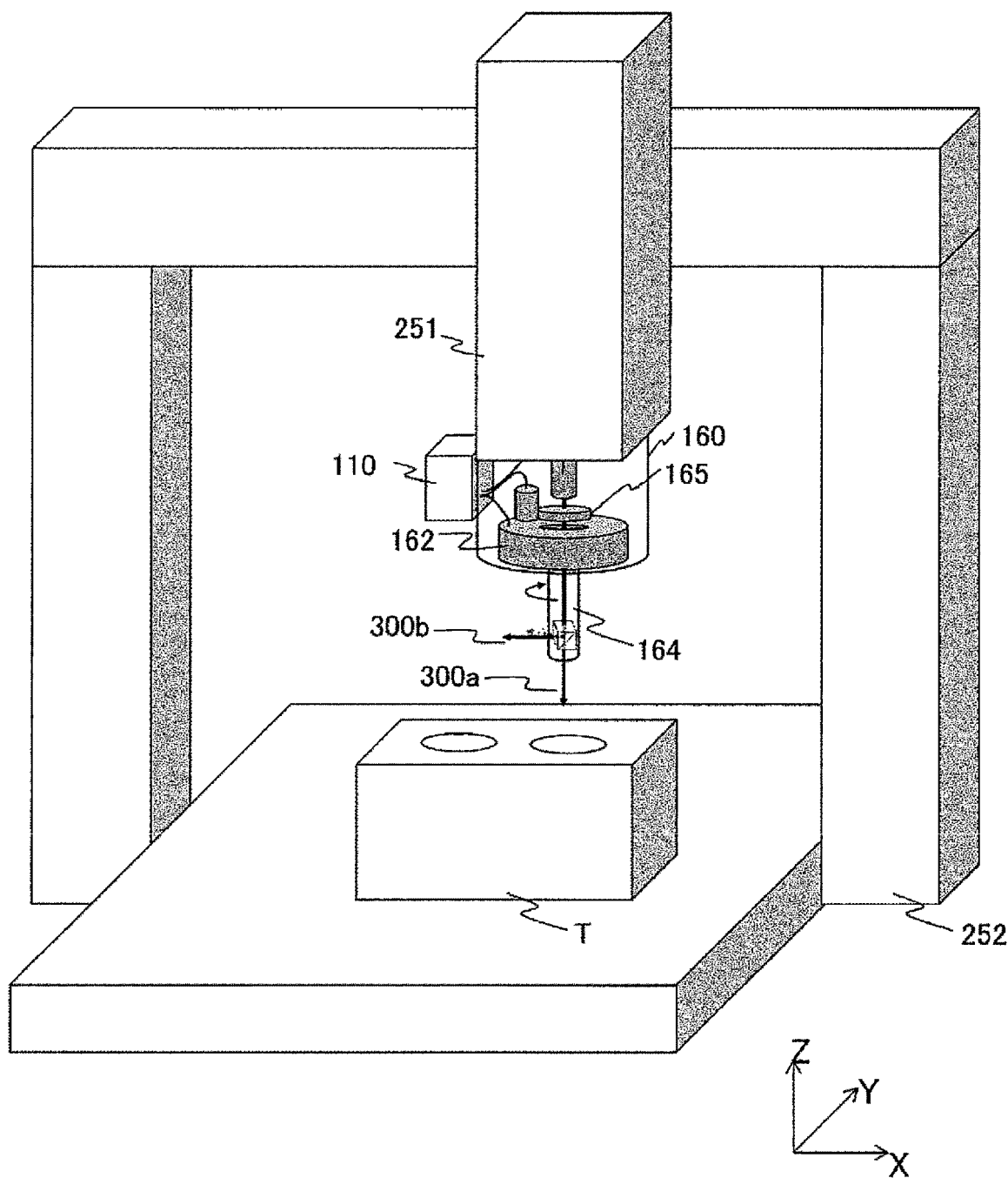

[Fig. 7]
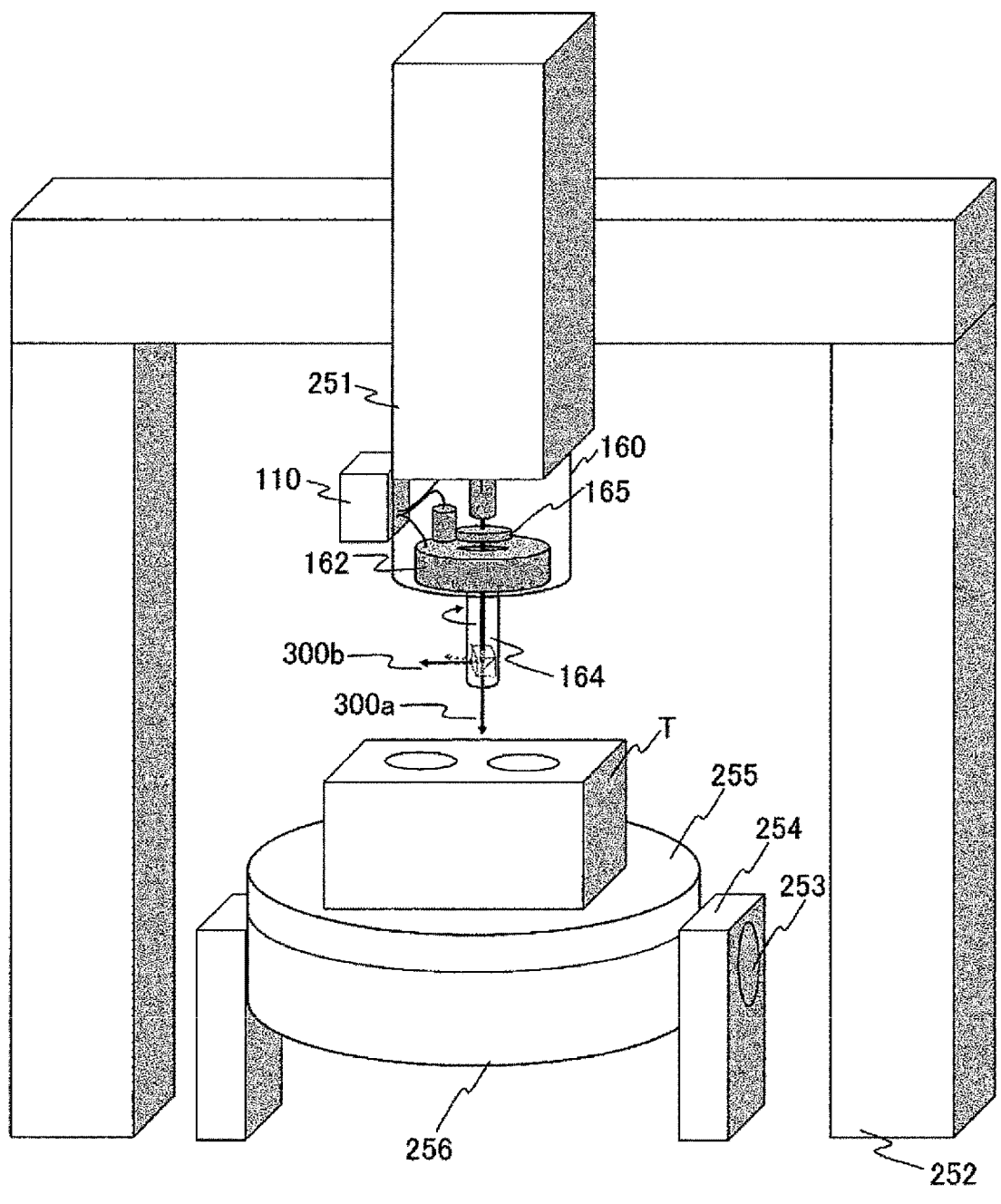

[Fig. 8]
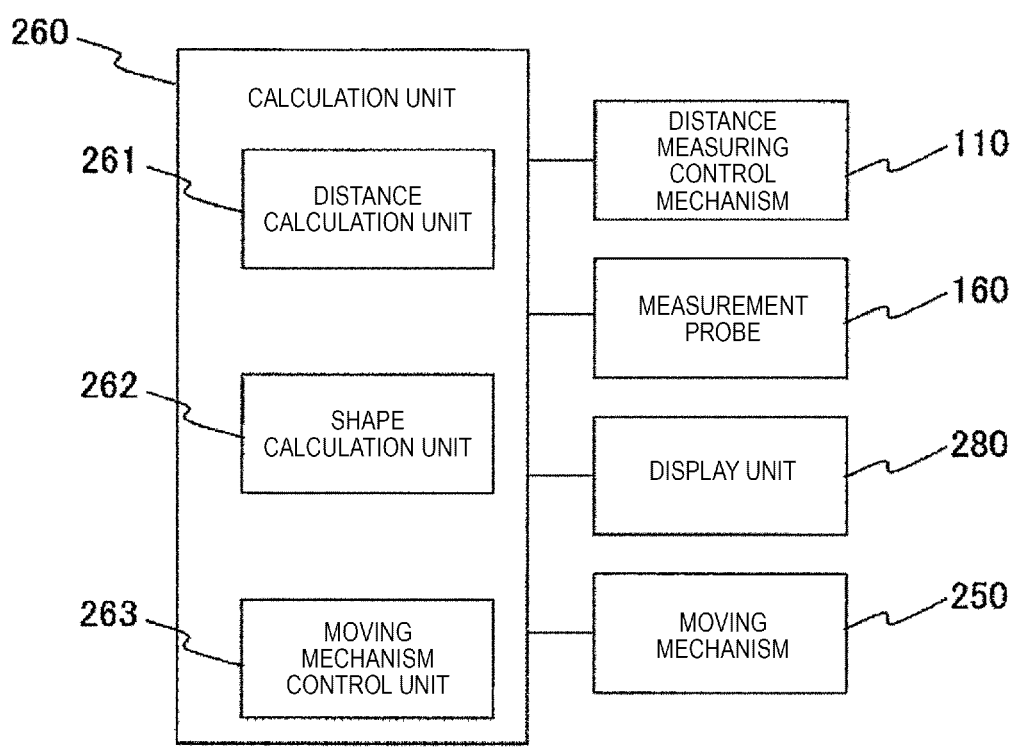

[Fig. 9]
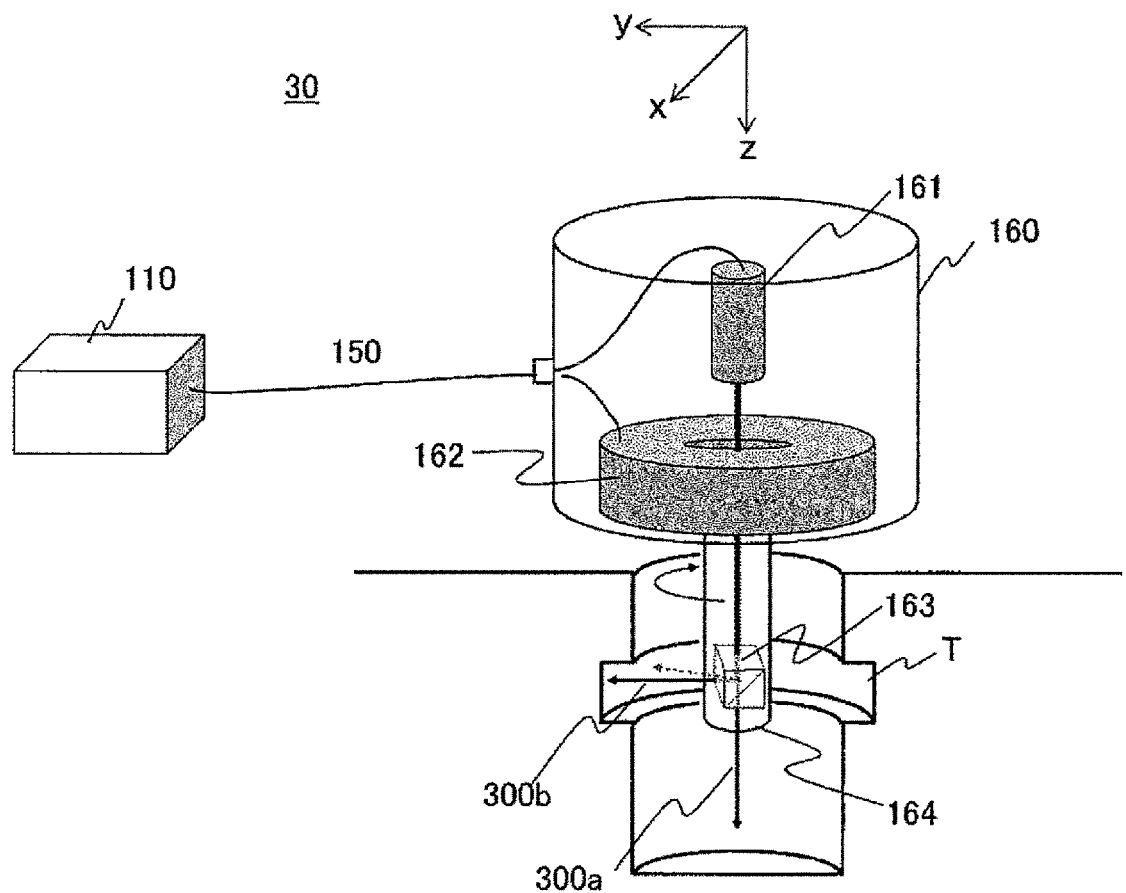

[Fig. 10]
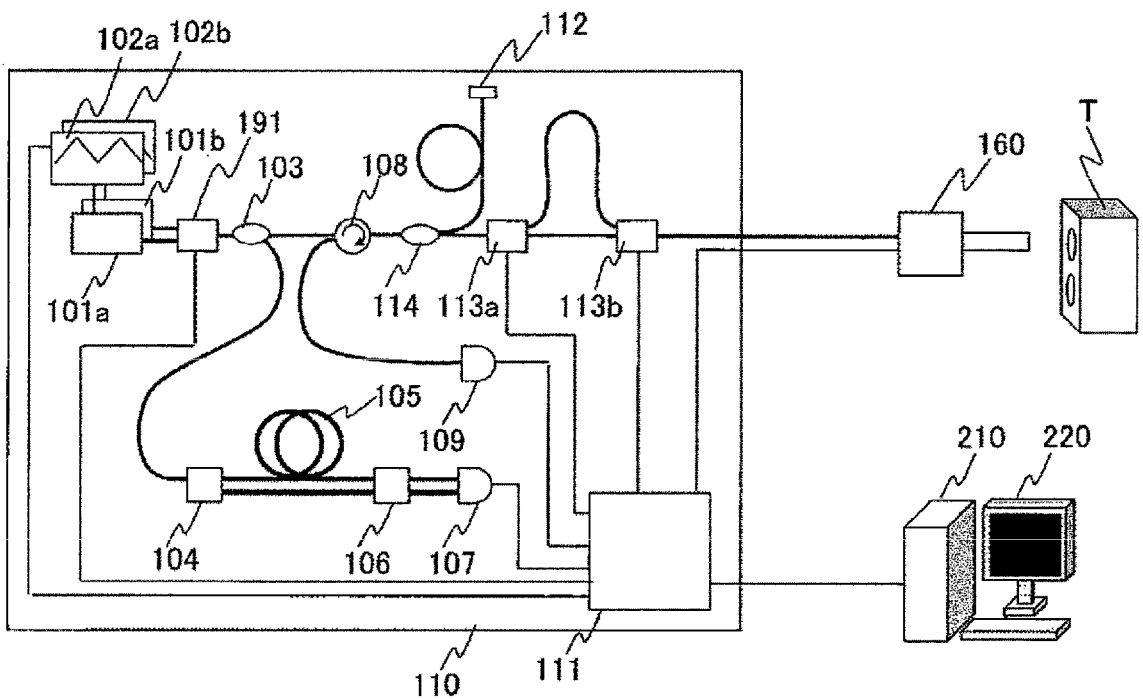
[Fig. 11]
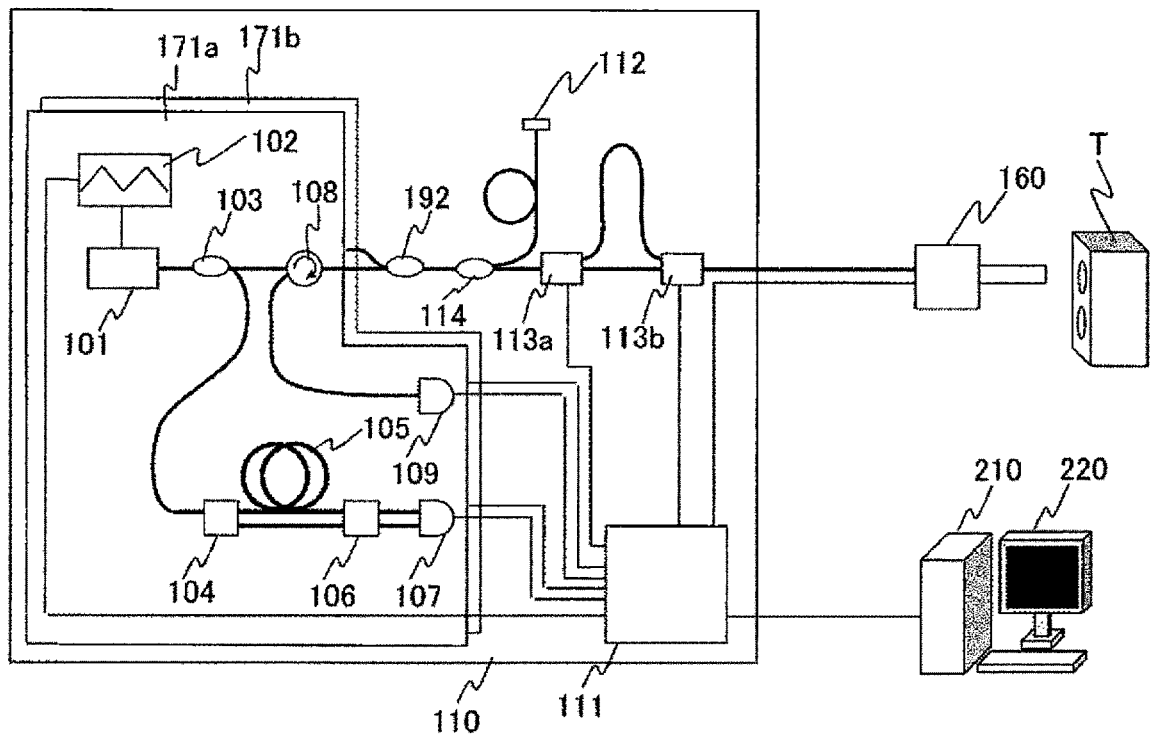

[Fig. 14]
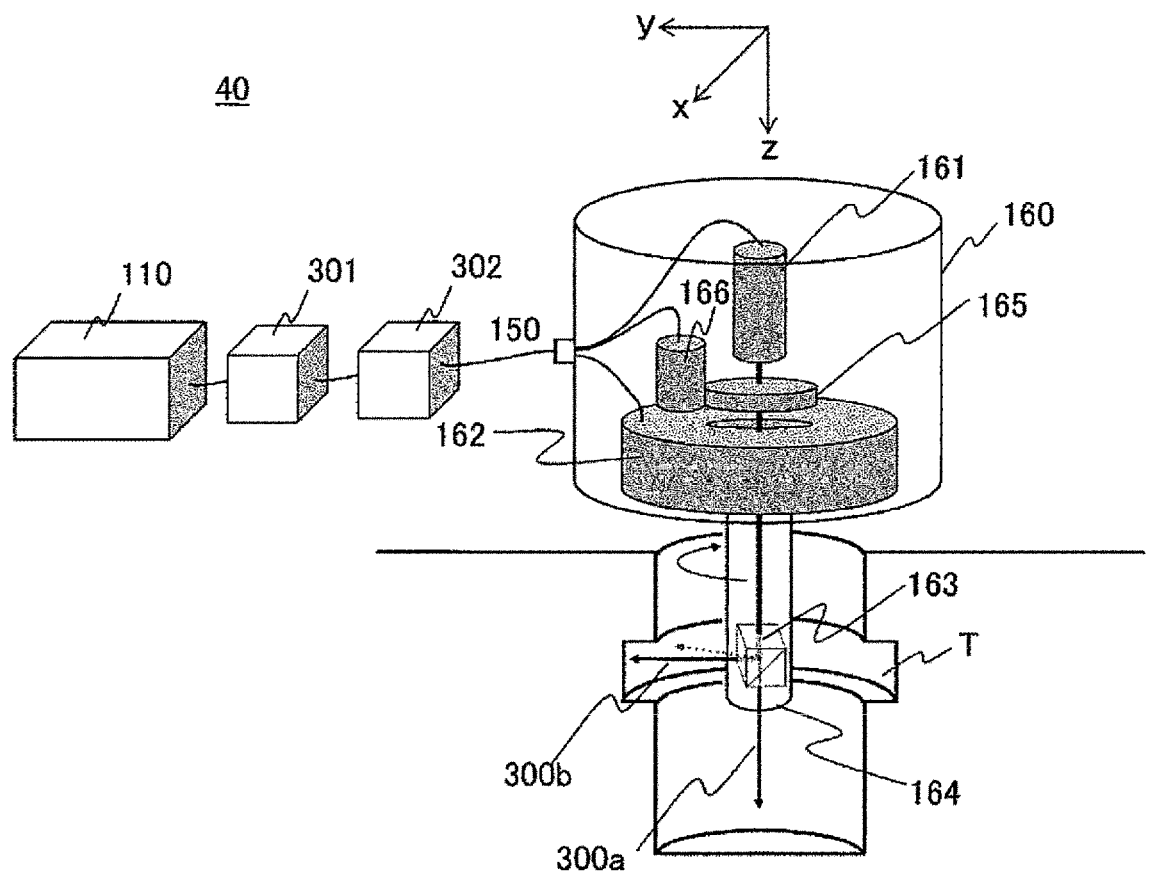

[Fig. 16]
50
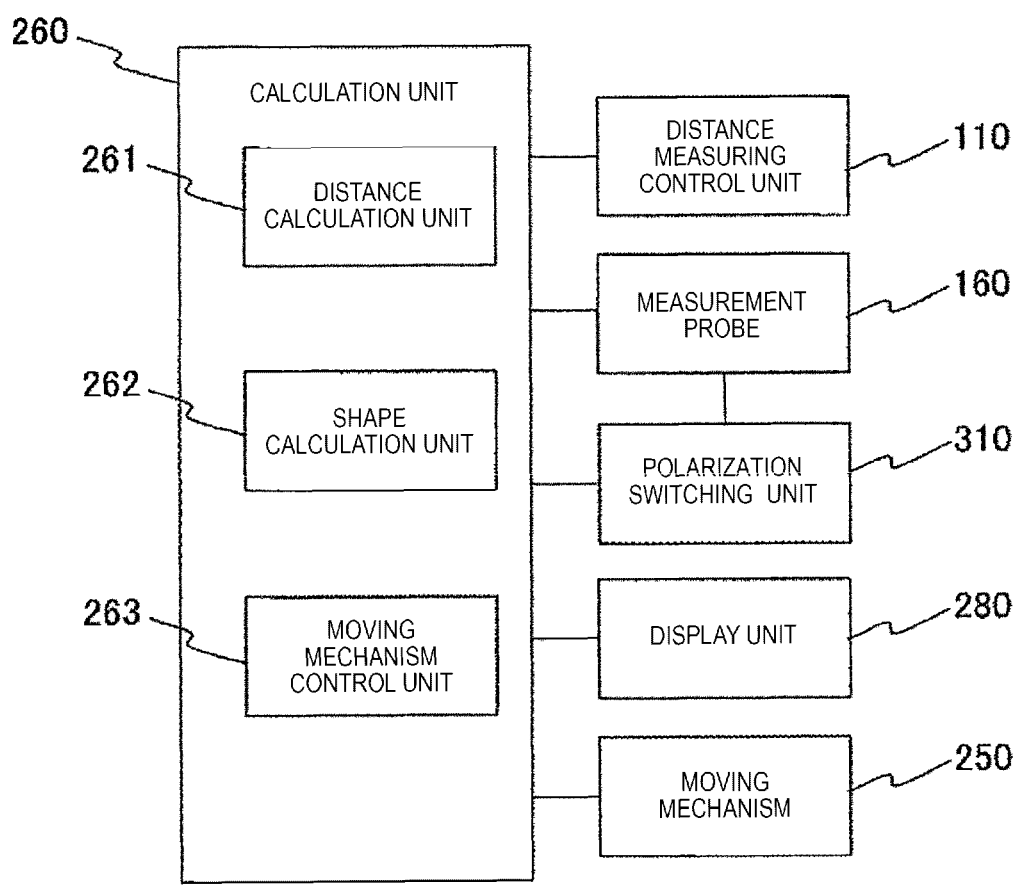

DISTANCE MEASURING DEVICE AND THREE-DIMENSIONAL SHAPE MEASURING APPARATUS

TECHNICAL FIELD

The present invention relates to a distance measuring device and a three-dimensional shape measuring apparatus. The present invention claims priority of Japanese Patent Application No. 2017-111271, filed on Jun. 6, 2017, and Japanese Patent Application No. 2018-046769 filed on Mar. 14, 2018, and with regard to designated countries where incorporation by reference of documents is permitted, the contents described in that application are incorporated into the present application by reference.

BACKGROUND ART

PTL 1 discloses a technique related to an optical measuring instrument. In paragraph [0034] of the document, "A rod-shaped shaft (support member) 36 fixedly and integrally provided in a housing portion 34, a reflection mirror 37 held by the shaft 36 in a movable state with the shaft 36 as a center, and a holding member 35 for holding the reflection mirror 37 at a predetermined position before and after a pivot are disposed in the housing portion 34. The shaft 36, the reflection mirror 37, and the holding member 35 constitute a direction control unit for changing a traveling direction of a light for measurement output from a light source 38 to a predetermined direction (for example, 90 degrees)." are described. In addition, in paragraph [0035], "The holding member 35 holds the reflection mirror 37 at a first position where the light for measurement from the light source 38 is not reflected before the reflection mirror 37 pivots about the shaft 36. In addition, the holding member 35 functions to hold the reflection mirror 37 at the second position, after the reflection mirror 37 is rotated about the shaft 36 by a predetermined angle (for example, 45 degrees) to move to a second position where the traveling direction of the light for measurement from the light source 38 is changed to a predetermined direction (90 degrees)," are described. In addition, in paragraph [0036], "As a result, the reflection mirror 37 does not change the traveling direction of the light for measurement from the light source 38 at the first position, and operates to change the traveling direction of the light for measurement from the light source 38 to a predetermined direction at the second position." is described.

CITATION LIST

Patent Literature

PTL 1: JP-A-2007-271601

SUMMARY OF INVENTION

Technical Problem

In a case of measuring a shape of a three-dimensional object by irradiating light, by changing a direction of irradiation, measurement can be performed while suppressing a movement of a measurement unit that emits light.

In the technique described in PTL 1, the direction of irradiation is changed by moving a mirror installed in the housing portion. In order to move the mirror in the housing portion, miniaturizing of the housing portion is limited. As a result, especially when measuring a narrow portion, the measurement may be limited.

The present invention has been made in view of the above-described points, and an object thereof is to provide a technology capable of realizing miniaturizing of a measuring unit in a distance measuring device.

Solution to Problem

Although the present application includes a plurality of means to solve at least a portion of the problem, if an example is given, it is as follows.

In order to solve the above problems, a distance measuring device according to an aspect of the present invention includes a light emitting unit that outputs measurement light, a polarization state control unit that controls polarization of the measurement light output from the light emitting unit, and an optical path switching element that selectively emits the measurement light controlled by the polarization state control unit, in which the polarization state control unit controls the polarization so as to emit the measurement light in a plurality of directions from the optical path switching element, and the optical path switching element receives reflected light with respect to an object of the measurement light emitted from the optical path switching element, the reflected light being used to measure a distance to the object.

Advantageous Effects of Invention

According to the present invention, it is possible to provide a technology for realizing miniaturizing of the measuring unit in the distance measuring device.

Problems, configurations, and effects other than those described above will be apparent from the description of the embodiments below.

BRIEF DESCRIPTION OF DRAWINGS

FIG. 1 is a schematic view illustrating an example of a distance measuring device according to a first embodiment.

FIG. 3 is a diagram illustrating an example of a configuration of a distance measuring control mechanism according to the first embodiment.

FIG. 4 is a graph illustrating an example of a method of determining a reflection position on a surface of an object to be measured from a reflection intensity profile.

FIG. 5 is a diagram illustrating another example of the configuration of the distance measuring control mechanism according to the first embodiment.

FIG. 6 is a schematic view illustrating an example of a three-dimensional shape measuring apparatus.

FIG. 7 is a schematic view illustrating another example of the three-dimensional shape measuring apparatus.

FIG. 8 is a diagram illustrating an example of functional blocks of the three-dimensional shape measuring apparatus.

FIG. 9 is a schematic view illustrating an example of a distance measuring device according to a second embodiment.

FIG. 10 is a diagram illustrating an example of a configuration of the distance measuring control mechanism according to the second embodiment.

FIG. 11 is a diagram illustrating another example of the configuration of the distance measuring control mechanism according to the second embodiment.

FIG. 14 is a schematic view illustrating an example of a distance measuring device according to a third embodiment.

FIG. 16 is a diagram illustrating an example of functional blocks of a three-dimensional shape measuring apparatus according to the third embodiment.

DESCRIPTION OF EMBODIMENTS

First Embodiment

Figures 2A, 2B:
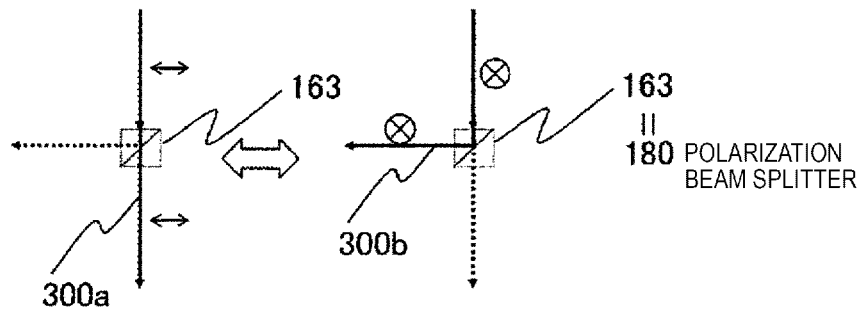
FIGS. 2A to 2F are diagrams for describing an operation of an optical path switching element.

Hereinafter, an example of an embodiment of the present invention will be described based on the drawings. FIG. 1 is a schematic view illustrating an example of a distance measuring device 10 according to a first embodiment. The distance measuring device 10 in the embodiment includes a distance measuring control mechanism. 110, a connection cable 150, and a measurement probe 160.

The distance measuring control mechanism 110 described later in detail outputs a measurement light to the measurement probe 160. The connection cable 150 has an optical fiber and guides the measurement light to the measurement probe 160. The measurement probe 160 is a device that irradiates an object T with the measurement light and guides a reflected light from the object T to the distance measuring control mechanism 110.

The measurement probe 160 includes a lens system 161, a rotation mechanism 162, an optical path switching element 163, a measurement probe tip end unit 164, a polarization state control unit 165, and a driving device 166 of the polarization state control unit. The lens system 161 focuses the measurement light output from the distance measuring control mechanism 110 and guided to the connection cable 150, and guides the measurement light to the polarization state control unit 165. The rotation mechanism 162 rotates the optical path switching element 163 about a rotation axis parallel to the measurement light output from the lens system 161 using a driving device such as a motor under the control of a distance calculation unit described later.

The optical path switching element 163 selectively emits a light using the measurement light controlled by the polarization state control unit 165. The optical path switching element 163 has an optical path switching function, and emits the light toward at least one of a first direction 300a that is the same as the traveling direction of the measurement light output from the lens system 161 and a second direction 300b substantially orthogonal to the first direction 300a. The optical path switching element 163 selectively emits the light according to, for example, a change in polarization direction. The optical path switching element 163 is, for example, a polarization beam splitter. The measurement probe tip end unit 164 locks the optical path switching element 163 and passes the light emitted from the optical path switching element 163. The measurement probe tip end unit 164 is, for example, a tubular shape having an opening portion in a lower side illustrated in FIG. 1 (first direction 300a), is made of a material that transmits the light, and locks the optical path switching element 163 to at least a portion of the inner wall. The measurement probe tip end unit 164 rotates about the rotation axis parallel to the measurement light output from the lens system 161, and the optical path switching element 163 rotates as the measurement probe tip end unit 164 rotates.

The configuration of the measurement probe tip end unit 164 is not limited to this configuration. For example, the optical path switching element 163 may be locked by one or a plurality of columns, and the optical path switching element 163 may be rotated as the columns are driven. In addition, the measurement probe tip end unit 164 may be, for example, a transparent two-layer cylinder, and the inner cylinder may lock the optical path switching element 163 and rotate the optical path switching element 163.

The polarization state control unit 165 controls the polarization of the measurement light output from the distance measuring control mechanism 110 by the control of the distance calculation unit. The polarization state control unit 165 changes the polarization direction of the measurement light, for example. The driving device 166 of the polarization state control unit drives the polarization state control unit 165 so that the polarization state control unit 165 changes the polarization of the measurement light. The polarization state control unit 165 and the driving device 166 of the polarization state control unit will be described later.

The measurement light output from the distance measuring control mechanism 110 reaches the polarization state control unit 165 via the connection cable 150 and the lens system 161, and the polarization state control unit 165 controls the polarization. The measurement light controlled by the polarization state control unit 165 reaches the optical path switching element 163.

The light emitted from the optical path switching element 163 in the first direction 300a reaches the object T from the opening portion of the measurement probe tip end unit 164. The light reflected or scattered by the object T travels a path of the emitted light backward, in the order of the optical path switching element 163, the polarization state control unit 165, the lens system 161, and the connection cable 150, to reach the distance measuring control mechanism 110. The distance measuring control mechanism 110 converts the reached measurement light into an electric signal and transmits the electric signal to a distance calculation unit (not illustrated). The distance calculation unit calculates the distance to the object T.

As illustrated in FIG. 1, in a case where the object T has a cylindrical shape, the depth to the bottom portion having the cylindrical shape can be measured by using the measurement light emitted in the first direction 300a.

In addition, the light emitted from the optical path switching element 163 in the second direction 300b is rotated according to the rotation of the optical path switching element 163, and transmits via the opening portion or the wall surface of the side surface of the measurement probe tip end unit 164 to be irradiated to the object T. The light reflected or scattered by the object T travels the path emitted similarly to the light emitted in the first direction 300a backward, reaches the distance measuring control mechanism 110, and the distance to the object T is calculated. By using the measurement light emitted in the second direction 300b, for example, the shape of the side surface of the cylindrical shape can be measured.

Figures 2C, 2D:
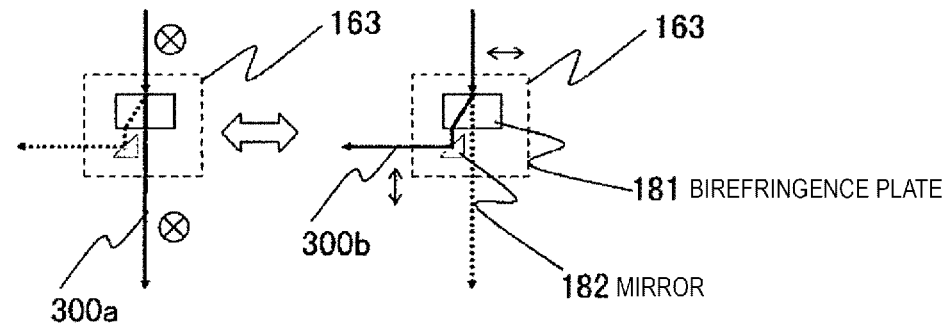
Figures 2E, 2F:
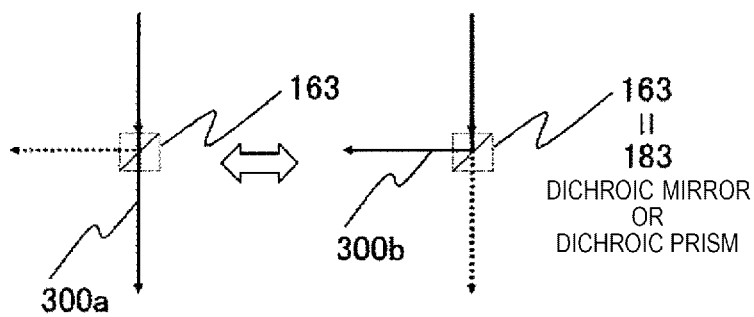

FIG. 2 is a diagram for describing an operation of the optical path switching element 163. FIGS. 2(A1) and 2(A2) illustrate an example in a case where the polarization beam splitter 180 is used as the optical path switching element 163. In FIG. 2(A1), the measurement light is polarized in a horizontal direction in FIG. 2, and FIG. 2(A2) illustrates a state where the measurement light is polarized in a depth direction (direction in rear and front sides of the paper) in FIG. 2.

As illustrated in FIG. 2 (A1), when the measurement light is incident in a state of being polarized in the horizontal direction in FIG. 2, the incident measurement light passes through the prism of the polarization beam splitter 180 and travels in the same first direction 300*a* as the incident measurement light. The light reflected by the object T travels the same path backward and reaches the distance measuring control mechanism 110.

In addition, as illustrated in FIG. 2(A2), when the measurement light is incident on the polarization beam splitter 180 in the state of being polarized in the depth direction in FIG. 2, the incident measurement light is reflected by the prism and travels in the second direction 300*b* substantially orthogonal to the measurement light. Similar to the light traveling in the first direction 300*a*, the light reflected by the object T travels the same path backward and reaches the distance measuring control mechanism 110.

When utilizing this property and controlling polarization so as to maintain a predetermined angle with respect to the optical path switching element 163 by the polarization state control unit 165, the traveling direction of the measurement light can be maintained in the first direction 300*a* or the second direction 300*b*. That is, by controlling the polarization of the measurement light by the polarization state control unit 165, the traveling direction of the measurement light can be switched to the first direction 300*a* or the second direction 300*b*.

For example, a half-wave plate is used as the polarization state control unit 165. When a polarization direction of the linearly polarized light incident on the half-wave plate is $\alpha$, and a direction of the main axis of the half-wave plate is $\beta$, a polarization direction of the emitted light is $2\beta-\alpha$.

When a reflection direction of the optical path switching element 163 rotated by the rotation mechanism 162 is $\gamma$, by controlling the polarization state control unit 165 to maintain $\gamma=2\beta-\alpha$ (that is, $\beta=(\gamma+\alpha)/2$), measurement by the light traveling in the first direction 300*a* can be performed. In addition, by controlling the polarization state control unit 165 so as to maintain $\gamma=2\beta-\alpha+\pi/2$ (that is, $\beta=(\gamma+\alpha)/2-\pi/4$), measurement by the light traveling in the second direction 300*b* can be performed.

The description will be supplemented regarding the control of the traveling direction of the measurement light.

Figure 12A:
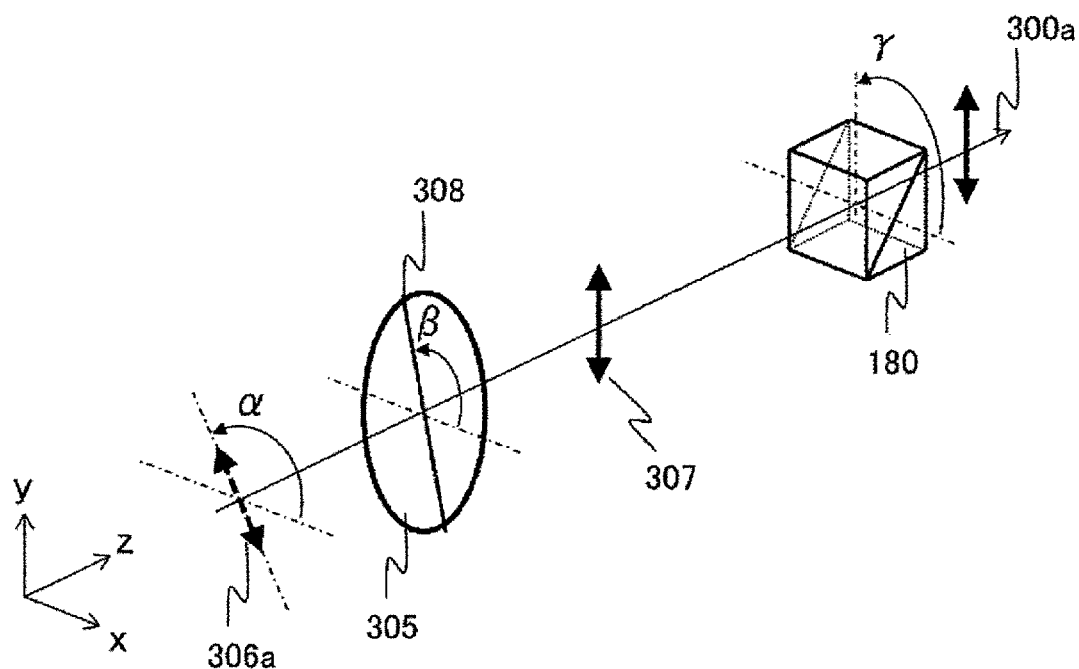
FIGS. 12A and 12B are diragrams for describing an absolute angle relationship of each optical element according to the first embodiment.
Figure 12B:
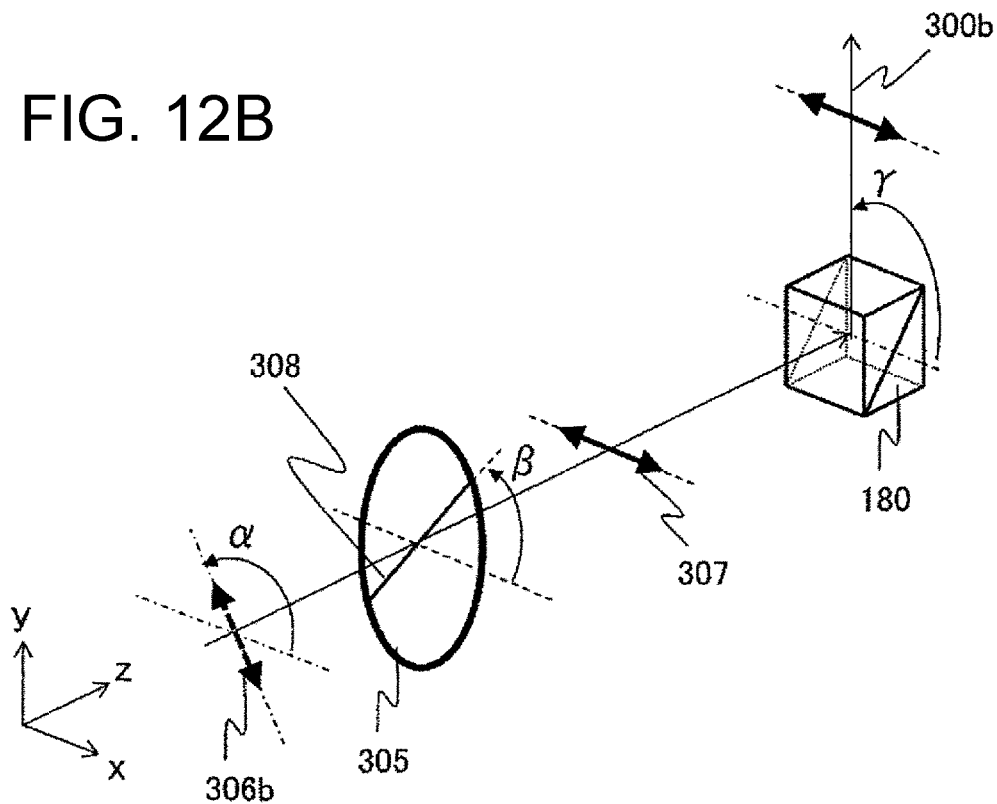

FIG. 12 is a diagram for describing an absolute angle relationship of each optical element according to the first embodiment. For example, the half-wave plate 305 is used as the polarization state control unit 165, and the polarization beam splitter 180 is used as the optical path switching element 163. When an angle of an oscillation direction of a linearly polarized light incident on the half-wave plate 305 is $\alpha$ and a direction of the main axis of the half-wave plate 305 is $\beta$, an angle of the oscillation direction of the linearly polarized light to be emitted is $2\beta-\alpha$. The angles $\alpha$ and $\beta$, and an angle $\gamma$ described later are assumed to be absolute rotation angles based on the coordinate axis x orthogonal to the first direction 300*a* (parallel to coordinate axis z).

An angle by which the polarization beam splitter 180 rotated by the rotation mechanism 162 reflects the light is assumed to be $\gamma$. Here, $\gamma$ can be expressed as $\gamma=\omega t+\gamma_0$ by using an angular velocity of $\omega$, a time of t, and an initial angle of $\gamma_0$. At this time, by controlling the half wavelength plate 305 to maintain $\gamma=2\beta-\alpha$ (that is, $\beta=(\gamma+\alpha)/2$), measurement by the light traveling in the first direction 300*a* can be performed (FIG. 12(A)). In addition, by controlling the half-wave plate 305 to maintain $\gamma=2\beta-\alpha+\pi/2$ (that is, $\beta=(\gamma+\alpha)/2-\pi/4$), measurement by the light traveling in the second direction 300*b* can be performed (FIG. 12(B)).

FIG. 13 is a diagram for describing a relative angle relationship of each optical element according to the first embodiment. Here, the relationship among an angle of the measurement light in the oscillation direction, the angle of the main axis of the half-wave plate, and the relative angle of the optical path switching element 163 will be described. For example, the half-wave plate 305 is used as the polarization state control unit 165, and the polarization beam splitter 180 is used as the optical path switching element 163. The polarization beam splitter 180 transmits the linearly polarized light having an oscillation direction parallel to an incident surface 309 (that is, emits in the direction of the first direction 300*a*), and reflects the linearly polarized light having an oscillation direction forming an angle of $\pi/2$ with respect to the incident surface 309 (that is, emits in the direction in the second direction 300*b*). The half-wave plate 305 tilts the oscillation direction of the linearly polarized light by twice the angle between the oscillation direction of the incident linearly polarized light and the main axis of the half-wave plate 305, and emits the linearly polarized light.

Here, a case where the incident surface 309 has an inclination of the relative angle $\theta$ with respect to a first measurement light oscillation direction 306*a* incident on the half-wave plate 305 is considered.

Figure 13A:
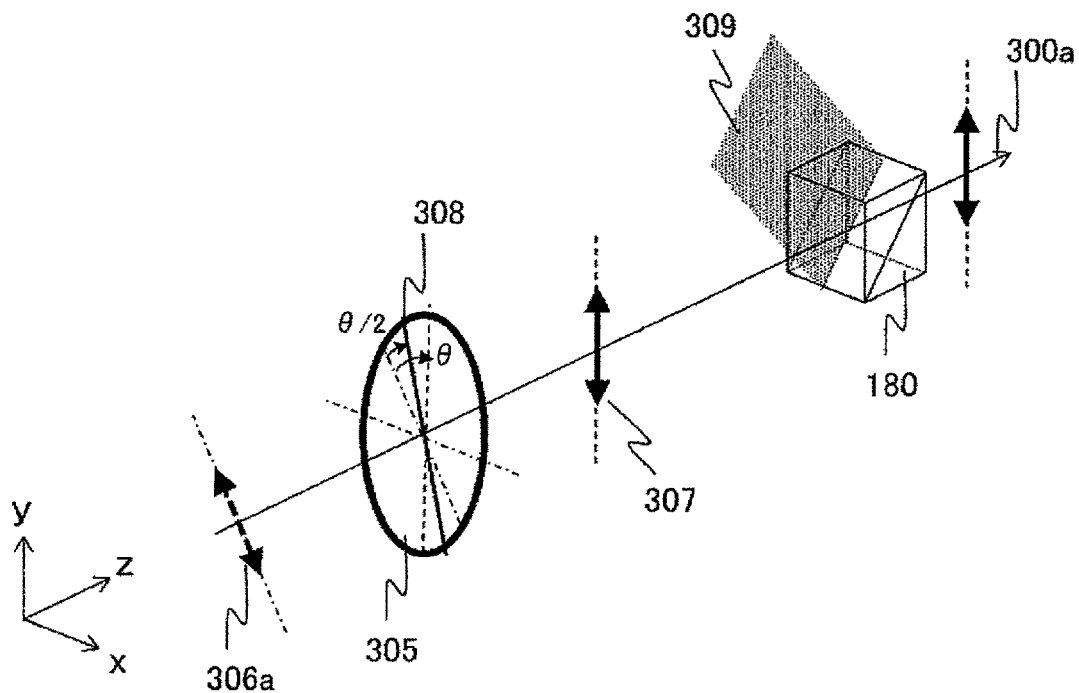
FIGS. 13A and 13B are diagrams for describing a relative angle relationship of each optical element according to the first embodiment.

As illustrated in FIG. 13(A), in the case of irradiating in the first direction 300*a* with the measurement light, the main axis 308 of the half-wave plate 305 controls the half-wave plate 305 so as to maintain an angle of $\theta/2$ with respect to the first measurement light oscillation direction 306*a* incident on the half-wave plate 305. Therefore, a measurement light oscillation direction 307 emitted from the half-wave plate 305 is maintained parallel to the incident surface 309.

Figure 13B:
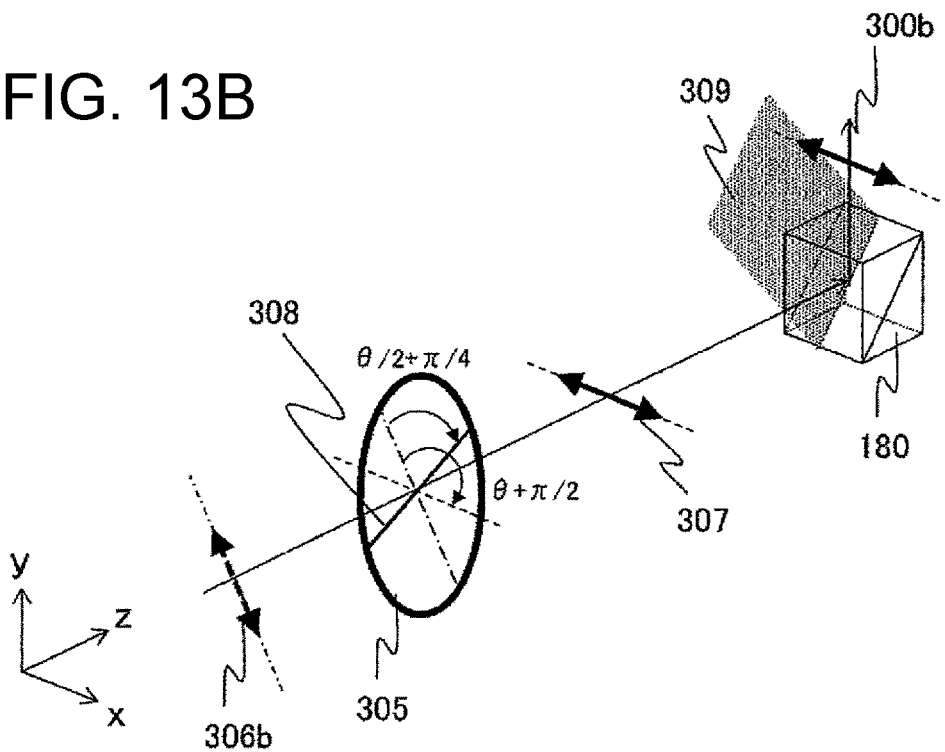

In addition, as illustrated in FIG. 13(B), in a case of irradiating in the second direction 300*b* with the measurement light, the main axis 308 of the half-wave plate 305 controls the half-wave plate 305 so as to maintain an angle of $\theta/2+\pi/4$ with respect to the first measurement light oscillation direction 306*a* incident on the half-wave plate 305. Therefore, a measurement light oscillation direction 307 emitted from the half wavelength plate 305 is maintained at an angle of $\pi/2$ with respect to the incident surface 309.

As described above, the polarization state control unit 165 can be controlled by rotating the half-wave plate 305 by the driving device 166 of the polarization state control unit.

It returns to the description of FIG. 2. In addition, as another example, a liquid crystal element can be used for the polarization state control unit 165. The polarization state control unit 165 can change the polarization direction of the measurement light to be output by controlling the voltage applied to the liquid crystal element and controlling an optical rotation of the liquid crystal element by the driving device 166 of the polarization state control unit.

In addition, as another example, by emitting the measurement light having a polarization component of random polarization or circular polarization from the lens system 161, using a polarization plate for the polarization state control unit 165, and rotating the polarization plate by the driving device 166 of the polarization state control unit, the polarization direction of the measurement light maybe controlled. In this case, when the direction of the main axis of the polarizing plate is β, the direction of the polarizing plate is controlled such that β=γ or β=γ−π/2 with respect to γ in the reflection direction of the optical path switching element 163. As a result, the direction of the light emitted from the optical path switching element 163 can be switched to the first direction 300*a* or the second direction 300*b*.

In addition, as another example, a fiber type polarization control element can be used for the polarization state control unit 165. If twisting or compression is applied to the optical fiber by the driving device 166 of the polarization state control unit, the polarization direction of the measurement light output from the polarization state control unit 165 can be controlled by induction of birefringence.

FIGS. 2(B1) and 2(B2) illustrate an example in a case where the combination of a birefringence plate 181 and the mirror 182 is used for the optical path switching element 163. FIG. 2(B1) illustrates a state where the measurement light is polarized in the depth direction of FIG. 2, and FIG. 2(B2) illustrates a state where the measurement light is polarized in the horizontal direction of FIG. 2.

The birefringence plate 181 has a property of shifting the optical path according to the polarization state of the measurement light. For example, as illustrated in FIGS. 2(B1) and 2(B2), the birefringence plate 181 is installed to straighten the measurement light polarized in the depth direction of FIG. 2, and to shift the optical path of the measurement light polarized in the horizontal direction in FIG. 2. In addition, by disposing the mirror 182 on the optical path shifted by the birefringence plate 181, an emission direction of the shifted measurement light is changed.

As a result, as in the case illustrated in FIGS. 2(A1) or 2(A2), it is possible to selectively emit in the first direction 300*a* having the same optical axis as the measurement light emitted from the lens system 161 or in the second direction 300*b* different in the optical axis from the first direction 300*a* with the light. In the cases illustrated in FIGS. 2(A1) and 2(A2) and in the cases illustrated in FIGS. 2(B1) and 2(B2) using the birefringence plate as the optical path switching element 163, the polarization direction and the emission direction of the light are in an opposite relationship.

According to the present embodiment, since the measurement light can be emitted from the optical path switching element 163 in different directions, the measurement probe tip end unit 164 can be miniaturized. For example, as compared with the case where the mirror is installed at the measurement probe tip end unit 164 and the emission direction of the measurement light is made different by driving the mirror, a space for driving the mirror in the measurement probe tip end unit 164 is not required, and it is possible to efficiently configure a portion used for measurement.

FIG. 3 is a diagram illustrating an example of a configuration of the distance measuring control mechanism 110 according to the first embodiment. The distance measuring control mechanism 110 illustrated in FIG. 3 measures the distance to the object T using a frequency modulated continuous waves (FMCW) or a swept-source optical coherence tomography (SS-OCT) (or wavelength sweep OCT). Although FMCW is mainly used for long distance measurement using a light source with a long coherence length, and SS-OCT is mainly used for measurement of fine structures using a light source with a short coherence length, the basic principle is common.

The distance measuring control mechanism 110 illustrated in FIG. 3 is connected to a control device 210 and a display device 220 in addition to the measurement probe 160 described above. The control device 210 is provided with the distance calculation unit that calculates the distance to the object T using the information received from the distance measuring control mechanism 110. The display device 220 outputs the measurement result. The distance calculation unit maybe included in the distance measuring control mechanism 110. In addition, the control device 210 may be connected in direct communication with the measurement probe 160.

The distance measuring control mechanism 110 includes a laser light source 101, an oscillator 102, optical fiber couplers 103, 104, 106 and 114, an optical fiber 105, light receivers 107 and 109, a circulator 108, a reference mirror 112, optical switches 113*a* and 113*b*, and a distance measuring control mechanism control unit 111.

The distance measuring control mechanism control unit 111 transmits a sweep waveform signal to the oscillator 102. The oscillator 102 injects a triangular wave current to the laser light source 101 to modulate the drive current. As a result, the laser light source 101 generates frequency modulated (FM) light temporally frequency-swept at a constant modulation speed.

The laser light source 101 may be configured as a semiconductor laser device with an external resonator, and the resonant wavelength of the laser light source 101 may be changed by a triangular wave control signal from the oscillator 102. As a result, the FM light temporally frequency-swept is generated from the laser light source 101.

The generated FM light is split by the optical fiber coupler 103. The optical fiber couplers 103, 104, and 114 may be beam splitters. One of the split lights is guided to the reference optical system and further split by the optical fiber coupler 104.

The split light is provided with a constant optical path difference in the optical fiber 105, thereafter multiplexed by the optical fiber coupler 106, and received by the light receiver 107. This is a configuration of the Mach-Zehnder interferometer, and the light receiver 107 generates a constant beat signal proportional to the optical path difference.

The other of the light split by the optical fiber coupler 103 passes through the circulator 108 and is branched by the optical fiber coupler 114, one is reflected by the reference mirror 112 to be a reference light, and the other is irradiated on the object T from the measurement probe 160. The distance measuring control mechanism 110 illustrated in FIG. 3 includes the optical switches 113*a* and 113*b*, which will be described later.

The light reflected by the object T returns to the distance measuring control mechanism 110 via the connection cable 150. The returned measurement light passes through the optical switches 113*a* and 113*b*, is merged with the reference light reflected by the reference mirror 112 at the optical fiber coupler 114, and is guided to the light receiver 109 by the circulator 108. A beat signal generated due to the interference between the reference light and the measurement light is detected.

The distance measuring control mechanism control unit 111 performs A/D conversion of the measurement beat signal received by the light receiver 109 using the reference beat signal received by the light receiver 107 as a sampling clock. Alternatively, the reference beat signal and the measurement beat signal are sampled at a constant sampling clock.

More specifically, the reference beat signal can be 90° out of phase by performing a Hilbert transform. Since it is possible to obtain the local phase of the signal from the reference signal before and after the Hilbert transform, it is possible to obtain the timing at which the reference signal becomes a constant phase by interpolating this phase.

By interpolating and sampling the measurement beat signal in accordance with this timing, it is possible to resample the measurement signal with reference to the reference signal. Alternatively, the similar effect can be obtained even if the measurement signal is sampled and A/D converted using the reference beat signal as a sampling clock by the AD/DA converter included in the distance measuring control mechanism control unit 111.

Regarding the analysis of the beat signal, although there is a difference Δt in the arrival timing of the measurement light and the reference light to the light receiver 109, since the frequency of the light source changes during this time, the beat signal of the beat frequency fb equal to the frequency difference due to this change is detected. Assuming that the frequency sweep width is Δv and the time required for modulation by Δv is T, there is a relationship of the following equation.

[Math. 1]
$$\Delta t = \frac{T}{2\Delta v} f_b \quad (1)$$

Since the distance L to a measurement object is half of the distance traveled by light during Δt, it can be calculated as in the following equation using the light velocity c in the atmosphere.

[Math. 2]
$$L = \frac{cT}{2\Delta v} f_b \quad (2)$$

When the measurement signal obtained by the distance measuring control mechanism control unit 111 is subjected to first fourier transform (FFT) to obtain the peak position and the size, which correspond to the reflection position and the reflection light amount of the object T, respectively. In the OCT device, since it is desired to visualize the scattering position and the size of scattering of a translucent body such as a living body, the amplitude spectrum of the FFT can be used as it is. In the present embodiment, in order to obtain the position of the surface of the object T accurately, interpolation as illustrated in FIG. 4 is performed and distance detection resolution is raised.

FIG. 4 is a graph illustrating an example of a method of determining the reflection position on the surface of the object to be measured from the reflection intensity profile. When the horizontal axis in FIG. 4 is the frequency axis of the FFT and the vertical axis is the reflection intensity, discrete data near the peak is as illustrated in FIG. 4. The interval between points, that is, the distance resolution, is c/2Δv. Since Δv=17.8 THz for a normal wavelength of 1300 nm and sweep width 100 nm for SS-OCT, the distance resolution c/2Δv=8.4 μm.

In addition, since Δv=267 GHz for the normal wavelength of 1500 nm and sweep width of 2 nm for FMCW, the distance resolution c/2Δv=0.56 mm. On the other hand, when a function such as a quadratic function or Gaussian function is fitted using three or more points near the peak as illustrated in FIG. 4 and the peak of the fitted function is used, it is possible to increase the resolution to approximately 1/10.

The description is returned to FIG. 3. Here, the optical switches 113a and 113b will be described. In order to obtain a beat signal due to interference between the reference light and the measurement light, the difference between the optical path length from the optical fiber coupler 114 to the reference mirror 112 and the optical path length from the optical fiber coupler 114 to the object T is required to be the coherence length of the laser light source 101 or less. In order to prevent this, the optical switch 113a and the optical switch 113b are simultaneously switched according to the distance from the optical fiber coupler 114 to the object T and the length of the optical fiber between the switches is changed.

In addition, in a case where the difference between the optical path length from the optical fiber coupler 114 to the reference mirror 112 and the optical path length from the optical fiber coupler 114 to the object T is too long, that is, in a case where the coherence length is long, the beat frequency is too high to be detected by the light receiver 109. Therefore, the optical switch 113a and the optical switch 113b are simultaneously switched to change the length of the optical fiber between the switches so that the beat frequency is a frequency detectable by the light receiver 109.

In FIG. 3, although there are two optical fibers to be switched, three or more optical fibers maybe installed according to the range of the measurement object, and the lengths may be switched. In addition, the switching timing may be constant, or may be changed according to the conditions such as the distance from the optical path switching element 163 of the object T. For example, the optical switch 113a and the optical switch 113b may be switched every one rotation in synchronization with the rotation of the optical path switching element 163.

In addition, although it is described that the optical fiber is used for the optical path, once light is propagated in free space using an optical fiber collimator or the like, the light may be switched by the mirror or the like, or the mirror may be moved to change the optical path length.

In addition, the optical switches 113a and 113b may be provided in the optical path between the optical fiber coupler 114 used for branching and the reference mirror 112, and the lengths of the optical fibers between the optical switches 113a and 113b maybe switched similarly. The optical switches 113a and 113b are controlled to be switched by the distance measuring control mechanism control unit 111.

In FIG. 3, the optical path from the optical fiber coupler 114 to the optical switch 113b is installed in the distance measuring control mechanism 110. However, these optical paths may be installed in the measurement probe 160 instead of the distance measuring control mechanism 110.

In addition, the distance measurement method performed using the distance measuring control mechanism 110 is not limited to the above-described example. For example, it is possible to use a method of irradiating the object T with pulse or burst light and measuring the time until the pulse or burst is received as in a time of flight (TOF) method, and a method of irradiating the object T with light continuously modulated in intensity and measuring the phase of the received signal as in a Phase Shift method or an optical comb distance measuring method. In addition, a distance may be measured by measuring defocus, or a white confocal method, an astigmatism method, a knife edge method, or a conoscopic holographic method may be used.

FIG. 5 is a diagram illustrating another example of the configuration of the distance measuring control mechanism 110 according to the first embodiment. The distance measuring control mechanism 110 illustrated in FIG. 5 is a configuration example using a spectral domain-optical coherence tomography (SD-OCT) (or frequency domain OCT) as the principle of distance measurement. The distance measuring control mechanism 110 includes a broadband light source 115 and a spectroscope 116 in addition to the circulator 108, the optical fiber coupler 114, the reference mirror 112, and the distance measuring control mechanism control unit 111.

The measurement light generated by the broadband light source 115 reaches the circulator 108 via the optical fiber. The measurement light derived from the circulator 108 is split by the optical fiber coupler 114, and a portion of the split measurement light is emitted to the object T via the measurement probe 160. A portion of the split measurement light is reflected by the reference mirror 112 as a reference light. The measurement light reflected by the object T returns to the distance measuring control mechanism 110 via the measurement probe 160, merges with the reflected light reflected by the reference mirror 112 at the optical fiber coupler 114, and is detected by the spectroscope 116 via the circulator 108.

The spectrum of the light to be detected illustrates oscillation of a frequency proportional to the difference in the optical path length between the object T and the reference mirror 112, where the horizontal axis is the wave number of light and the vertical axis is the intensity. Therefore, the distance measuring control mechanism control unit 111 illustrated in the figure realizes the distance measurement by analyzing this frequency.

Another example of the configuration of the distance measuring control mechanism 110 will be described. The distance measuring control mechanism 110 can adopt a configuration using a white confocal method for distance measuring. In that case, the distance measuring control mechanism 110 does not include the reference mirror 112 and the optical fiber coupler 114 illustrated in FIG. 5, and instead, the lens system 161 is intentionally configured to cause chromatic aberration. In addition, the measurement probe 160 is used in which the focal position is different depending on the wavelength of the measurement light.

In this case, when the light reflected or scattered on the object T is collected again by the lens system 161 and returned to the distance measuring control mechanism 110, only a wavelength in focus at the distance to the object T is captured. That is, when the light is detected by the spectroscope 116 and the wavelength at which the spectrum reaches the peak is calculated by the distance measuring control mechanism control unit 111, distance measurement of the object T can be realized. According to this configuration example, the detected spectrum data itself can be obtained as the data illustrated in FIG. 4 without performing the FFT.

FIG. 6 is a schematic view illustrating an example of the three-dimensional shape measuring apparatus 20. The three-dimensional shape measuring apparatus 20 in the present embodiment measures the three-dimensional shape of the object T using the function of the distance measuring device 10. The three-dimensional shape measuring apparatus 20 includes a moving mechanism. The moving mechanism has an XZ-axis moving mechanism 251 and a Y-axis moving mechanism 252. The measurement probe 160 is installed in the XZ-axis moving mechanism 251. The distance measuring device 10 having the measurement probe 160 is installed in the XZ-axis moving mechanism 251 illustrated in FIG. 6.

The XZ-axis moving mechanism 251 moves in the X-axis direction (horizontal direction illustrated in FIG. 6) and the Z-axis direction (vertical direction illustrated in FIG. 6). The XZ-axis moving mechanism 251 supports the measurement probe 160, and the measurement probe tip end unit 164 moves along with the movement of the XZ-axis moving mechanism 251. The Y-axis moving mechanism 252 is a gate-shaped structure, and moves in the Y-axis direction (depth direction illustrated in FIG. 6). The Y-axis moving mechanism 252 supports the XZ-axis moving mechanism 251, and the measurement probe tip end unit 164 instructed by the XZ-axis moving mechanism 251 moves along with the movement of the Y-axis moving mechanism 252.

The configuration of the moving mechanism is not limited thereto, and any method may be used as long as the measurement probe tip end unit 164 is moved in three axial directions. For example, the measurement probe tip end unit 164 may be moved in three axial directions by installing only the measurement probe 160 in the XZ-axis moving mechanism 251 without installing the distance measuring control mechanism 110 in the XZ-axis moving mechanism 251.

The three-dimensional shape measuring apparatus 20 in the present embodiment has a normal axis configuration used in a three-dimensional measuring apparatus, and it is possible to realize highly functional non-contact shape measurement by installing the measurement probe 160 of the distance measuring device 10 of the present embodiment instead of the probe of the three-dimensional measuring apparatus.

In addition, in a normal three-axis processing machine, the Z-axis is provided on the tool side, and the X-axis and Y-axis are provided on the object T side in many cases, and the configuration is different from that of the three-dimensional shape measuring apparatus 20 illustrated in FIG. 6. However, by installing the measurement probe 160 in the present embodiment in the three-axis processing machine, on-machine measurement on the machine can be realized.

In addition, by installing the measurement probe 160 of the present embodiment in a multi-degree of freedom robot and moving the measurement probe tip end unit 164, a three-dimensional shape measuring apparatus 20 capable of measurement with a high degree of freedom can be configured.

FIG. 7 is a schematic view illustrating another example of the three-dimensional shape measuring apparatus 20. Points different from that of the three-dimensional shape measuring apparatus 20 illustrated in FIG. 6 will be described. The moving mechanism of the three-dimensional shape measuring apparatus 20 illustrated in FIG. 7 includes a rotation mechanism 256 in addition to the XZ-axis moving mechanism 251 and the Y-axis moving mechanism 252. The rotation mechanism 256 is locked by a rotation axis 253 supported by the structure 254 and rotates about the rotation axis 253. In addition, the rotation mechanism 256 is a rotation axis (not illustrated) perpendicular to the rotation axis 253, and rotates about a rotation axis extending in the Z-axis direction illustrated in FIG. 7.

A sample stage 255 is installed on the rotation mechanism 256, and the sample stage 255 rotates as the rotation mechanism 256 rotates. As a result, the object T placed on the sample stage 255 moves. According to this configuration, the posture of the object T in two degrees of freedom can be controlled.

That is, the three-dimensional shape measuring apparatus 20 illustrated in FIG. 7 not only can control the relative position three degrees of freedom between the measurement probe 160 and the object T using the XZ-axis moving mechanism 251 and the Y-axis moving mechanism 252, but also can control the relative position two degrees of freedom using the rotation mechanism 256, so that a total of five degrees of freedom can be controlled. As a result, it is possible to measure every part of the object T from all directions.

By installing the measurement probe 160 in a normal five-axis processing machine, it is possible to implement on-machine measurement on the processing machine. In addition, since the number and the configuration of the degrees of freedom differ depending on the processing machine, the three-dimensional shape measuring apparatus 20 in the present embodiment is not limited to the configurations illustrated in FIGS. 6 and 7.

FIG. 8 is a diagram illustrating an example of functional blocks of the three-dimensional shape measuring apparatus 20. The three-dimensional shape measuring apparatus 20 is provided with a calculation unit 260, the distance measuring control mechanism 110, the measurement probe 160, a display unit 280, and a moving mechanism 250. The distance measuring control mechanism 110 and the measurement probe 160 are the same as those of the example described above. The calculation unit 260 generally controls entire three-dimensional shape measuring processing using a calculation device such as a central processing unit (CPU) (not illustrated). The display unit 280 is a device that outputs a measurement result, and has the same function as the display device 220 described above.

The calculation unit 260 is provided with the distance calculation unit 261, a shape calculation unit 262, and a moving mechanism control unit 263. The distance calculation unit 261 analyzes the measurement beat signal and the reference beat signal received by the distance measuring control mechanism 110, and converts the signals into a distance. In addition, the distance calculation unit 261 controls the measurement probe 160 to control the rotation angle of the measurement probe tip end unit 164 and the polarization state of the polarized light synchronized with the rotation.

The shape calculation unit 262 measures the shape of the object T using the data notified by the distance calculation unit 261. The data notified by the distance calculation unit 261 includes data in the detection direction of the measurement light. The information measured by the shape calculation unit 262 is output via the display unit 280.

The moving mechanism control unit 263 controls the moving mechanism 250 to control the relative position between the measurement probe 160 and the object T. The position and posture of the object T controlled by the moving mechanism control unit 263 are notified to the distance calculation unit 261. The calculation unit 260 may be installed in the distance measuring control mechanism 110 or the measurement probe 160.

Second Embodiment

Next, a distance measuring device 30 according to a second embodiment will be described.

FIG. 9 is a schematic view illustrating an example of the distance measuring device 30 according to the second embodiment. Hereinafter, points different from these of the first embodiment will be described. The distance measuring device 30 in the present embodiment differs from the distance measuring device 10 in the first embodiment in that the driving device 166 of the polarization state control unit and the polarization state control unit 165 are not provided. The distance measuring device 30 in the present embodiment switches the emission direction of the measurement light by using the wavelength rather than the polarization state of the measurement light.

The measurement light emitted from the distance measuring control mechanism 110 is introduced into the optical path switching element 163 via the lens system 161.

FIGS. 2(C1) and 2(C2) are diagrams for describing the operation of the optical path switching element 163 in the second embodiment. FIGS. 2(C1) and 2(C2) illustrate an example in the case where a dichroic mirror 183 is used as the optical path switching element 163. The dichroic mirror 183 may be a dichroic prism.

The dichroic mirror and the dichroic prism reflect a light of a wavelength longer than a boundary with a certain wavelength as a boundary and transmit a light of a short wavelength. Alternatively, it reflects a light of a wavelength shorter than the boundary and transmits a light of a long wavelength. FIG. 2(C1) illustrates a state where the measurement light is transmitted. The measurement light travels in the first direction 300a. FIG. 2(C2) illustrates a state where the measurement light is reflected. The measurement light travels in the second direction 300b substantially orthogonal to the measurement light. That is, by using the dichroic mirror 183 as the optical path switching element 163, it is possible to emit the measurement light in different directions.

Similar to the first embodiment, the optical path switching element 163 in the present embodiment receives the light reflected by the object T, travels the emission path backward, and guides the light to the distance measuring control mechanism 110.

FIG. 10 is a diagram illustrating an example of the configuration of the distance measuring control mechanism 110 according to the second embodiment. The distance measuring control mechanism 110 in this aspect includes laser light sources 101a and 101b, oscillators 102a and 102b, and an optical fiber switcher 191, in addition to the optical fiber couplers 103, 104, 106, and 114, the optical fiber 105, the light receivers 107 and 109, the circulator 108, the reference mirror 112, the optical switches 113a and 113b, and the distance measuring control mechanism control unit 111.

The laser light source 101a and the laser light source 101b have different wavelengths from each other. The oscillator 102a oscillates the laser light source 101a, and the oscillator 102b oscillates the laser light source 101b. The laser light source 101a and the laser light source 101b may be oscillated by one oscillator 102.

The lights emitted from the oscillators 102a and 102b are selectively controlled by the optical fiber switcher 191. The optical fiber switcher 191 is controlled by the distance measuring control mechanism control unit 111. An element that combines the light of different wavelengths into one optical fiber may be used, instead of the optical fiber switcher 191. For example, a so-called wavelength division multiplexing (WDM) coupler can be used. In this case, the wavelength of the measurement light can be selected by causing the distance measuring control mechanism control unit 111 to select the light from the laser light source 101a or the light from the laser light source 101b.

By using the distance measuring control mechanism 110 of this aspect, the lights of different wavelengths can be selectively incident on the optical path switching element 163. As a result, the measurement light is selectively emitted from the optical path switching element 163 in the first direction 300a or the second direction 300b.

FIG. 11 is a diagram illustrating another example of the configuration of the distance measuring control mechanism 110 according to the second embodiment. The distance measuring control mechanism 110 in this aspect includes two types of OCT or FMCW light generation and detection units 171*a* and 171*b*. The OCT or FMCW light generation and detection units 171*a* and 171*b* respectively include the laser light source 101, the oscillator 102, the optical fiber couplers 103, 104, and 106, the optical fiber 105, the light receivers 107 and 109, and the circulator 108. The laser diode according to the OCT or FMCW light generation and detection unit 171*a* and the OCT or FMCW light generation and detection unit 171*b* has different wavelength ranges from each other.

In addition, the distance measuring control mechanism 110 in this aspect includes a WDM coupler 192. The WDM coupler 192 combines the lights emitted from the OCT or FMCW light generation and detection unit 171*a* and the OCT or FMCW light generation and detection unit 171*b* and causes the light to incident on the optical fiber coupler 114.

According to this configuration, the measurement lights having two wavelength ranges are simultaneously generated. As a result, the measurement lights are simultaneously emitted from the optical path switching element 163 in the first direction 300*a* and the second direction 300*b*. The measurement beat signal of the reflected light and the reference beat signal are detected by the light receiver 107 and the light receiver 109 respectively included in the OCT or FMCW light generation and detection unit 171*a* and the OCT or FMCW light generation and detection unit 171*b*. The distance measuring control mechanism control unit 111 processes two sets of signals in parallel. As a result, the distance measurement in the first direction 300*a* and the second direction 300*b* can be performed in parallel.

Hereinbefore, in the first embodiment and the second embodiment, the measurement light is output from the optical path switching element 163 in two different directions according to the combination of the property of the measurement light and the optical path switching element 163. As a result, it is possible to miniaturize the configuration used for the measurement without requiring a configuration such as moving the mirror at the measurement probe tip end unit 164.

Third Embodiment

Next, a distance measuring device 40 according to a third embodiment will be described.

FIG. 14 is a schematic view illustrating an example of the distance measuring device 40 according to the third embodiment. Hereinafter, points different from these of the first embodiment will be described. The distance measuring device 30 in the present embodiment is provided with a polarization stabilization device 301 and a linear polarization switching switch 302 at a rear portion of the distance measuring control mechanism 110. In the present embodiment, a half-wave plate is used as the polarization state control unit 165.

The polarization stabilization device 301 has a function of stabilizing and outputting the polarization state of the input measurement light into linearly polarized light oscillating in a fixed direction. The linear polarization switching switch 302 has a function of rotating the direction of the linearly polarized light of the input measurement light by $\pi/2$ and outputting the input measurement light by applying a voltage to the built-in liquid crystal element. The polarization stabilization device 301 and the linear polarization switching switch 302 are used to output the linearly polarized light having a desired oscillation direction, and can be realized by a combination of a normal polarization state analyzer and a polarization state generator.

Here, when the angle in the oscillation direction of the linearly polarized light incident on the half-wave plate in a case where a voltage is not applied (off) to the linear polarization switching switch 302 is $\alpha$, the angle in the oscillation direction of the linearly polarized light emitted in a case where a voltage is applied (on) to the linear polarization switching switch 302 is $\alpha+\pi/2$. The angle $\alpha$, and the angles $\beta$ and $\gamma$ described later are assumed to be absolute rotation angles based on the coordinate axis x orthogonal to the first direction 300*a* (parallel to coordinate axis z).

Here, the angle of the direction where the optical path switching element 163 rotated by the rotation mechanism 162 reflects the light is $\gamma$, and the direction of the main axis of the half-wave plate is $\beta$. At this time, without applying a voltage to the linear polarization switching switch 302, the half wavelength plate is controlled to maintain $\gamma=2\beta-\alpha$ (that is, $\beta=(\gamma+\alpha)/2$). The measurement can be performed by the light traveling in the first direction 300*a*. In addition, by applying a voltage to the linear polarization switching switch 302 and controlling the half-wave plate so as to maintain an angle of $\gamma=2\beta-\alpha$, measurement by the light traveling in the second direction 300*b* can be performed.

FIG. 15 is a diagram briefly describing a relative angle relationship of each optical element according to the third embodiment. Here, the relationship among an angle of the measurement light in the oscillation direction, the angle of the main axis of the half-wave plate, and the relative angle of the optical path switching element 163 will be described. For example, the half-wave plate 305 is used as the polarization state control unit 165, and the polarization beam splitter 180 is used as the optical path switching element 163. The polarization beam splitter 180 transmits the linearly polarized light having an oscillation direction parallel to an incident surface 309 (that is, emits in the direction of the first direction 300*a*), and reflects the linearly polarized light having an oscillation direction forming an angle of $\pi/2$ with respect to the incident surface 309 (that is, emits in the direction in the second direction 300*b*). The half-wave plate 305 tilts the oscillation direction of the linearly polarized light by twice the angle between the oscillation direction of the incident linearly polarized light and the main axis of the half-wave plate 305, and emits the linearly polarized light.

Here, a case where the incident surface 309 has an inclination of the relative angle $\theta$ with respect to the first measurement light oscillation direction 306*a* incident on the half-wave plate 305 is considered.

Figure 15A:
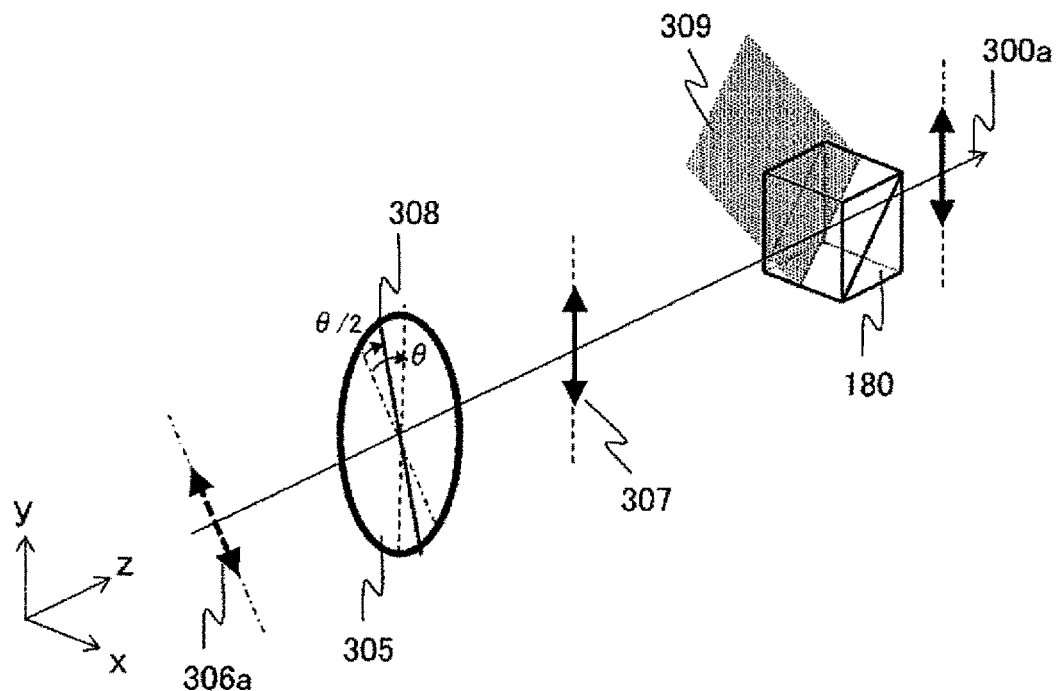
FIGS. 15A and 15B are diagrams briefly describing a relative angle relationship of each optical element according to the third embodiment.

As illustrated in FIG. 15(A), in the case of irradiating in the first direction 300*a* with the measurement light, first, by turning off the linear polarization switching switch 302, the measurement light oscillation direction incident on the half wavelength plate 305 is switched to the first measurement light oscillation direction 306*a*. At this time, the main axis 308 of the half-wave plate 305 controls the half-wave plate 305 so as to maintain an angle of $\theta/2$ with respect to the first measurement light oscillation direction 306*a* incident on the half wavelength plate 305. Therefore, the measurement light oscillation direction 307 emitted from the half-wave plate 305 is maintained parallel to the incident surface 309.

Figure 15B:
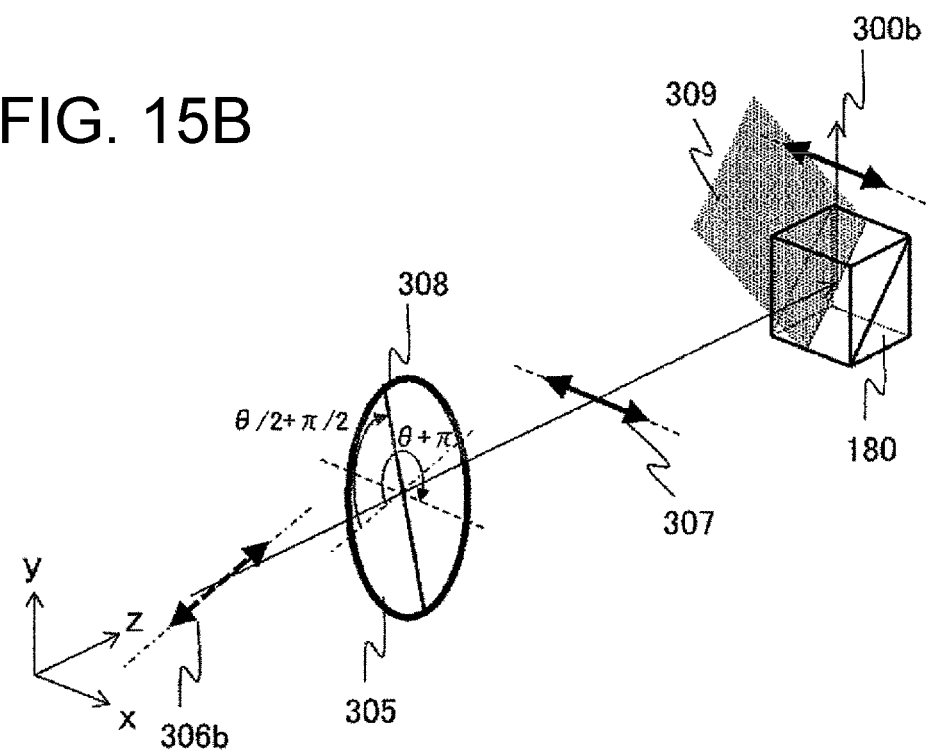

In addition, as illustrated in FIG. 15(B), in the case of irradiating in the second direction 300*b* with the measurement light, first, by turning on the linear polarization switching switch 302, the measurement light oscillation direction incident on the half wavelength plate 305 is switched from the first measurement light oscillation direction 306*a* to the second measurement light oscillation direction 306*b*. At this time, the angle of the main axis 308 of the half-wave plate 305 is controlled to be the same angle as that in the case of FIG. 13(A) (that is, angle of the main axis 308 of the half-wave plate 305 with respect to the second measurement light oscillation direction 306b is θ/2+π/2). Therefore, the measurement light oscillation direction 307 emitted from the half-wave plate 305 is maintained at an angle of π/2 with respect to the incident surface 309.

That is, according to the third embodiment, since the angle of the main axis 308 of the half-wave plate 305 is constant regardless of the measurement direction, the control of the driving device 166 of the polarization state control unit can be simplified. In addition, by changing the measurement direction by the electrical control of the linear polarization switching switch 302 without the mechanical operation of the driving device 166 of the polarization state control unit, it is possible to switch the measurement direction at high speed. As a result, a significant reduction in measurement time is realized.

In the first embodiment, the measurement direction can be changed from the first direction 300a to the second direction 300b by using a normal servomotor as the driving device 166 of the polarization state control unit. For example, in the case of using a servomotor having a rotation speed of 500 rpm, a measurement direction switching time of at least approximately 100 milliseconds is required to rotate the servomotor by −π/4.

On the other hand, since the switching speed in the measurement direction by the normal linear polarization switching switch 302 is approximately 0.1 milliseconds or less, it is possible to switch the measurement direction at high speed by the configuration illustrated in the third embodiment.

FIG. 16 is a diagram illustrating an example of functional blocks of a three-dimensional shape measuring apparatus 50 according to the third embodiment. Hereinafter, points different from the first embodiment will be described. The three-dimensional shape measuring apparatus 50 is provided with a polarization switching unit 310 in addition to the function of the three-dimensional shape measuring apparatus 20 illustrated in FIG. 8.

The polarization switching unit 310 is a device that maintains the polarization state of the measurement light in the linearly polarized light, and switches the polarization state according to the measurement direction, and transmits a switched linearly polarized light to the measurement probe 160. The polarization switching unit 310 corresponds to the polarization stabilization device 301 and the linear polarization switching switch 302. The polarization switching unit 310 (linear polarization switching switch 302) may switch the measurement direction by the manual operation of the user, or may switch the measurement direction by control from the distance calculation unit 261.

Fourth Embodiment

FIG. 17 is a diagram illustrating an example of a configuration of the measurement probe tip end unit 164 according to the fourth embodiment. The measurement probe tip end unit 164 is provided with one or two condenser lens systems 304, in addition to the optical path switching element 163.

A measurement light 303 shaped into a condensed state by the lens system 161 is condensed by the condenser lens system 304 located in front of or behind the optical path switching element 163. For example, in a case where the measurement light 303 is shaped into a parallel light by the lens system 161, a condensing position of the measurement light 303 is determined by the condenser lens system 304.

Figure 17A:
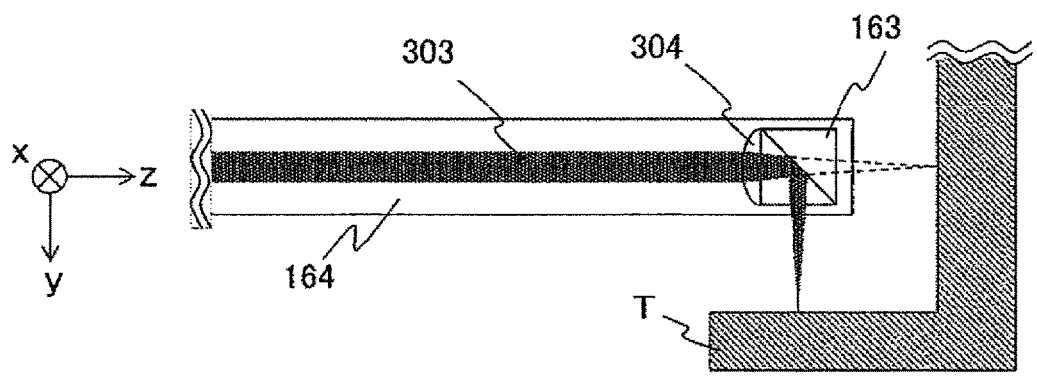
FIGS. 17A and 17B are diagrams illustrating an example of a configuration of a measurement probe tip end unit according to a fourth embodiment.

In the example of FIG. 17(A), the condenser lens system 304 is disposed between the polarization state control unit 165 and the optical path switching element 163. In this case, the measurement light in any of the first direction 300a and the second direction 300b is condensed at the same focal length. Compared to FIG. 17(B) described later, since only one condenser lens system 304 is used, manufacture is simple and the diameter of the measurement probe tip end unit 164 can be reduced.

Figure 17B:
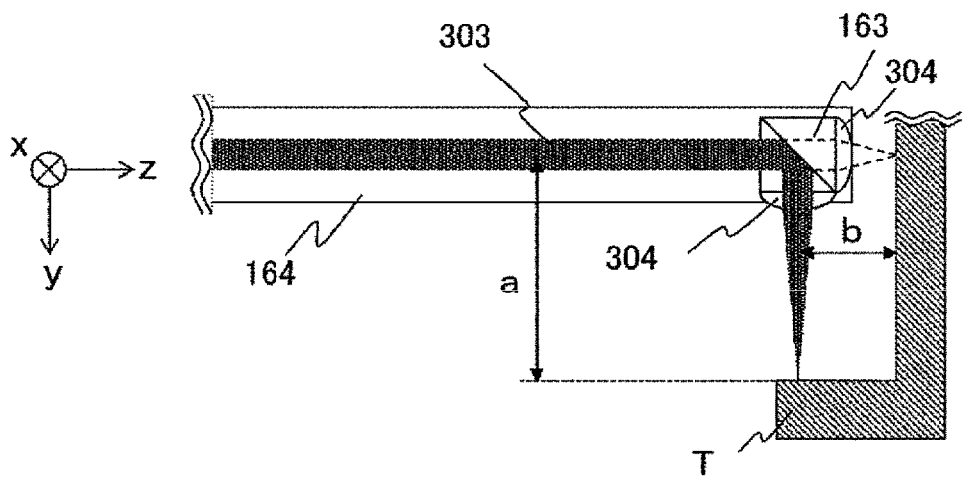

In the example of FIG. 17(B), the condenser lens system 304 is respectively disposed between the optical path switching element 163 and the measurement object T in different measurement directions (first direction 300a and second direction 300b). In this case, each condenser lens system 304 may be configured such that the measurement light in any of the first direction 300a and the second direction 300b is condensed to the same focal length, or each condenser lens system 304 maybe configured to be condensed to different focal lengths from each other. For example, in a case where the distances a and b according to the measurement direction to the object T are significantly different from each other, it is possible to select the focal length according to each distance.

A plurality of measurement probe tip end units 164 having different focal lengths maybe prepared, and the measurement probe tip end units 164 may be configured to be attachable to and exchangeable from the measurement probe 160. For example, by exchanging the measurement probe tip end unit 164 according to a hole diameter of the object T, it is possible to adjust the condensing position of the measurement light 303 to be adapted to the distance to the measurement object T.

In the first to third embodiments described above, the lens system 161 is provided with a focus variable mechanism such as, for example, a motorized variable focus lens, so that the focusing position of the measurement light can be adjusted according to the measured distance to the object T. On the other hand, in the fourth embodiment, the measurement probe tip end unit 164 is attachable and exchangeable, so that it is not necessary to provide the lens system 161 with the focus variable mechanism.

A plurality of measurement probe tip end units 164 having different lengths in the Z-axis direction may be prepared, and the measurement probe tip end units 164 may be configured to be attachable to and exchangeable from the measurement probe 160. For example, by exchanging the measurement probe tip end unit 164 according to a hole depth of the object T, it is possible to adjust so that the measurement light reliably reaches the measurement object T.

In addition, a plurality of measurement probe tip end units 164 having the same specifications may be prepared, and the measurement probe tip end units 164 may be configured to be attachable to and exchangeable from the measurement probe 160. In this manner, when the measurement probe tip end unit 164 is broken, it is possible to replace only the measurement probe tip end unit 164 instead of repairing the entire measurement probe 160.

Furthermore, a joining portion between the measurement probe tip end unit 164 and the measurement probe 160 has a structure capable of restraining the relative positional relationship between the optical path switching element 163 and the polarization state control unit 165, so that adjustment at the time of exchange can be simplified.

As described above, in the present embodiment, since the change of the length of the measurement probe tip end unit 164 and the change of the focal length in each measurement direction can be easily selected, it is possible to help the measurement according to the application of the user.

In each of the above-described embodiments, in order to maintain the distance measurement accuracy, the measurement probe tip end unit 164 needs to suppress the expansion and contraction due to the environmental temperature change, the deflection of its own weight, or the oscillation accompanying rotation. Examples of the material of the measurement probe tip end unit 164 that satisfies these requirements include carbon fiber reinforced plastics (CFRP) having light weight, high strength, high rigidity, high oscillation damping, low coefficient of thermal expansion and the like.

Hereinbefore, although each embodiment and modification according to the present invention are described, the present invention is not limited to an example of the embodiment described above, and includes various modifications. For example, the example of the embodiment described above is described in detail in order to make the present invention easy to understand, and the present invention is not limited to one provided with all the configurations described here. In addition, a portion of the configuration of the example of the embodiment can be replaced with a configuration of another example. In addition, the configuration of another example can be added to the configuration of the example of the embodiment. In addition, another configuration can be added, deleted, or replaced to a portion of the configuration of the example of each embodiment. In addition, each of the configurations, functions, processing units, processing means described above may be realized by hardware, for example, by designing a portion or all of these with an integrated circuit. In addition, control lines and information lines in the drawings indicate what is considered to be necessary for the description, and do not necessarily indicate all. It may be considered that substantially all configurations are connected to each other.

In addition, the configuration of the distance measuring device described above can also be classified into more components according to the processing content. In addition, one component can also be classified to perform more processing.

REFERENCE SIGNS LIST 10, 30: distance measuring device,
20: three-dimensional shape measuring apparatus,
101, 101a, 101b: laser light source,
102, 102a: 102b: oscillator,
103, 104, 106, 114: optical fiber coupler,
105: optical fiber,
107, 109: light receiver,
108: circulator,
110: distance measuring control mechanism,
111: distance measuring control mechanism control unit,
112: reference mirror,
113a, 113b: optical switch,
115: broadband light source,
116: spectroscope,
150: connection cable,
160: measurement probe,
161: lens system,
162, 256: rotation mechanism,
163: optical path switching element,
164: measurement probe tip end unit,
165: polarization state control unit,
166: driving device of polarization state control unit,
171a, 171b: light generation and detection unit for OCT or FMCW,
180: polarization beam splitter,
181: birefringence plate,
182: mirror,
183: dichroic mirror,
191: optical fiber switcher,
192: WDM coupler,
210: control device,
220: display device,
250: moving mechanism,
260: calculation unit,
261: distance calculation unit,
262: shape calculation unit,
263: moving mechanism control unit,
251: XZ-axis moving mechanism,
252: Y-axis moving mechanism,
253: rotation axis,
254: structure,
255: sample stage,
280: display unit,
300a: first direction,
300b: second direction,
301: polarization stabilization device,
302: linear polarization switching switch,
303: measurement light,
304: condenser lens system,
305: half-wave plate,
306a: first measurement light oscillation direction incident on half-wave plate,
306b: second measurement light oscillation direction incident on half-wave plate,
307: measurement light oscillation direction emitted from half-wave plate,
308: main axis of half-wave plate,
309: incident surface,
310: polarization switching unit,
T: object

The invention claimed is:

1. A distance measuring device comprising:
a measuring probe; and
a measuring probe tip end connected to the measuring probe,
wherein the measuring probe includes:
a lens that passes and focuses measurement light from a light emitting source; and
a wave plate that controls polarization of the measurement light output from the lens; and
wherein the measuring probe tip includes an optical path switching element, wherein the optical path switching element selectively emits the measurement light according to the polarization of the measurement light,
wherein the optical path switching element receives reflected light with respect to an object of the measurement light emitted from the optical path switching element and outputs the reflected light to the lens, the reflected light being used to measure a distance to the object,
wherein between the lens and the optical path switching element, an optical path of the measurement light overlaps an optical path of the reflected light, and
wherein the measuring probe tip end is narrower than the measuring probe.

2. The distance measuring device according to claim 1, wherein the measuring probe includes a rotation mechanism that rotates the measuring probe tip end, with a rotation axis along with the optical path of the measurement light from the lens to the optical path switching element.

3. The distance measuring device according to claim 1, wherein wave plate changes a polarization direction of the measurement light, and
the optical path switching element selectively emits the measurement light according to a change in the polarization direction.

4. The distance measuring device according to claim 1, further comprising:
a processor configured to determine the distance by measuring a propagation time of the measurement light.

5. The distance measuring device according to claim 4, wherein the processor determines the distance by detecting the reflected light of a wavelength in focus.

6. The distance measuring device according to claim 1, wherein the optical path switching element is a polarization beam splitter or a combination of a birefringence prism and a mirror.

7. A three-dimensional shape measuring apparatus comprising:
the distance measuring device according to claim 1, and
a moving mechanism that controls a relative position between the measuring probe and the object.

8. The three-dimensional shape measuring apparatus according to claim 7, further comprising:
a processor configured to measure a three dimensional shape of the object based on the relative position, a rotation angle of the measuring probe tip end, and a state of the polarization of the measurement light.

9. The distance measuring device according to claim 1, further comprising:
a plurality of condenser lenses corresponding to a plurality of directions where the measurement lights are emitted,
wherein, from a perspective of an optical path of the measurement light from the optical path switching element to the object, the plurality of condenser lenses are placed behind the optical path switching element, and
wherein each of the condenser lenses condenses the measurement light to a predetermined focal length.

10. The distance measuring device according to claim 9, wherein each of the condenser lenses has a different focal length.

11. The distance measuring device according to claim 1, wherein the measuring probe tip end is exchangeable from the measuring probe.

12. The distance measuring device according to claim 1, comprising:
a replacement measuring probe tip end attachable to the measuring probe,
wherein the measuring probe tip end includes a first condenser lens focusing the measurement light to a first focal length,
wherein another measuring probe tip end includes a second condenser lens focusing the measurement light to a second focal length different from the first focal length.

13. The distance measuring device according to claim 12, wherein the measuring probe includes a rotation mechanism that rotates the measuring probe tip end, with a rotation axis along with the optical path of the measurement light from the lens to the optical path switching element.

14. The distance measuring device according to claim 12, wherein the wave plate changes a polarization direction of the measurement light, and
wherein the optical path switching element selectively emits the measurement light according to a change in the polarization direction.

15. The distance measuring device according to claim 12, further comprising:
a processor configured to determine the distance by measuring a propagation time of the measurement light.

16. The distance measuring device according to claim 15, wherein the processor determines the distance by detecting the reflected light of a wavelength in focus.

17. The distance measuring device according to claim 12, wherein the optical path switching element is a polarization beam splitter or a combination of a birefringence prism and a mirror.

18. The distance measuring device according to claim 12, further comprising:
a plurality of condenser lenses corresponding to a plurality of directions where the measurement lights are emitted,
wherein, from a perspective of an optical path of the measurement light from the optical path switching element to the object, the plurality of condenser lenses are placed behind the optical path switching element, and
wherein each of the condenser lenses condenses the measurement light to a predetermined focal length.

19. The distance measuring device according to claim 18, wherein each of the condenser lenses has a different focal length.

20. The distance measuring device according to claim 12, wherein the measuring probe tip end is exchangeable from the measuring probe.

21. The distance measuring device according to claim 12, further comprising:
a replacement measuring probe tip end attachable to the measuring probe,
wherein a length of the replacement measuring probe tip end is different from a length of the measuring probe tip end.

22. The distance measuring device according to claim 1, further comprising:
a replacement measuring probe tip end attachable to the measuring probe,
wherein a length of the replacement measuring probe tip end is different from a length of the measuring probe tip end.

23. A distance measuring device comprising:
a measuring probe; and
a measuring probe tip end connected to the measuring probe, wherein the measuring probe includes:
a lens that passes and focuses measurement light from a light emitting source; and
a wave plate that controls polarization of the measurement light output from the lens;
wherein the measuring probe tip includes an optical path switching element, wherein the optical path switching element selectively emits the measurement light according to the polarization of the measurement light,
wherein the optical path switching element receives reflected light with respect to an object of the measurement light emitted from the optical path switching element and outputs the reflected light to the lens, the reflected light being used to measure a distance to the object, wherein between the lens and the optical path switching element, an optical path of the measurement light overlaps an optical path of the reflected light, and wherein the measuring probe includes a rotation mechanism that rotates the measuring probe tip end, with a rotation axis along with the optical path of the measurement light from the lens to the optical path switching element.

* * * * *